US012662024B2

(12) United States Patent
Sathyanarayanasetty et al.

(10) Patent No.: US 12,662,024 B2
(45) Date of Patent: Jun. 23, 2026

(54) CLIP FOR VEHICLE SEAT CABLE ASSEMBLY

(71) Applicant: Fisher & Company, Incorporated, St. Clair Shores, MI (US)

(72) Inventors: Raghu Belagur Sathyanarayanasetty, Roseville, MI (US); Sapan Mahendra Poptani, Northville, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 279 days.

(21) Appl. No.: 18/633,817

(22) Filed: Apr. 12, 2024

(65) Prior Publication Data

US 2025/0128647 A1 Apr. 24, 2025

Related U.S. Application Data

(60) Provisional application No. 63/544,851, filed on Oct. 19, 2023.

(51) Int. Cl.
B60N 2/22 (2006.01)
B60N 2/20 (2006.01)
(Continued)

(52) U.S. Cl.
CPC ...................................... B60N 2/20 (2013.01)

(58) Field of Classification Search
CPC ........ B60N 2/20; B60N 2/236; B60N 2/3011; B60N 2/206; B60N 2/305; B60N 2/01583; B60N 2/2352; B60N 2/366
(Continued)

(56) References Cited

U.S. PATENT DOCUMENTS 343,025 A 6/1886 Gordon
910,192 A 1/1909 Grouvelle
(Continued)

FOREIGN PATENT DOCUMENTS

CA 2369034 A1 7/2002
CA 2759299 A1 12/2011
(Continued)

OTHER PUBLICATIONS

Notice of Allowance regarding U.S. Appl. No. 17/720,609 dated Nov. 1, 2023.
(Continued)

*Primary Examiner* — Shin H Kim
(74) *Attorney, Agent, or Firm* — Harness, Dickey & Pierce, PLC

(57) ABSTRACT

A cable assembly for a seat assembly may include a cable, a first clip, and a second clip. The cable may include a first end and an end cap disposed thereon. The first clip may be slidingly engaged on the cable and include a first body including a distal portion and an attachment portion. The first body may define an aperture in the attachment portion. A first portion of the cable may extend through the aperture. The second clip may be configured to be removably engaged to the first clip. The second clip may include a second body, a first wall, sidewalls, and a first portion extending from the second body. The cable may have a first dimension extending between a first side of the first clip and the end cap. The first portion of the second clip has a second dimension that is the same as the first dimension.

20 Claims, 24 Drawing Sheets

(51) Int. Cl.
*B60N 2/235* (2006.01)
*B60N 2/68* (2006.01)

(58) Field of Classification Search
USPC .......... 297/362, 362.11, 366, 367 R, 378.12
See application file for complete search history.

(56) References Cited

U.S. PATENT DOCUMENTS

| | | | |
|---|---|---|---|
| 3,084,246 A | 4/1963 | Rieppel et al. |
| 3,736,026 A | 5/1973 | Ziegler et al. |
| 3,863,503 A | 2/1975 | Loeb et al. |
| 3,893,206 A | 7/1975 | Pickles et al. |
| 3,953,069 A | 4/1976 | Tamura et al. |
| 4,010,979 A | 3/1977 | Fisher, III et al. |
| 4,076,309 A | 2/1978 | Chekirda et al. |
| 4,103,970 A | 8/1978 | Homier |
| 4,218,092 A | 8/1980 | Schach et al. |
| 4,219,234 A | 8/1980 | Bell |
| 4,223,586 A | 9/1980 | Miller |
| 4,243,264 A | 1/1981 | Bell |
| 4,279,442 A | 7/1981 | Bell |
| 4,365,838 A | 12/1982 | Berg |
| 4,372,610 A | 2/1983 | Fisher, III et al. |
| 4,451,966 A | 6/1984 | Lee |
| 4,457,557 A | 7/1984 | Une |
| 4,470,633 A | 9/1984 | Fourrey et al. |
| 4,484,779 A | 11/1984 | Suzuki |
| 4,509,806 A | 4/1985 | Dudouyt |
| 4,579,387 A | 4/1986 | Bell |
| D285,119 S | 8/1986 | Krautz |
| 4,632,401 A | 12/1986 | Kar et al. |
| 4,634,182 A | 1/1987 | Tanaka |
| 4,645,263 A | 2/1987 | Fourrey et al. |
| 4,659,146 A | 4/1987 | Janiaud |
| 4,684,174 A | 8/1987 | Bell |
| 4,687,252 A | 8/1987 | Bell et al. |
| 4,698,896 A | 10/1987 | Osterwald et al. |
| 4,705,319 A | 11/1987 | Bell |
| 4,711,493 A | 12/1987 | Schrom et al. |
| 4,720,145 A | 1/1988 | Bell |
| 4,726,622 A | 2/1988 | Palvolgyi |
| 4,733,912 A | 3/1988 | Secord |
| 4,747,641 A | 5/1988 | Bell |
| 4,773,693 A | 9/1988 | Premji et al. |
| 4,789,205 A | 12/1988 | Pipon et al. |
| 4,795,213 A | 1/1989 | Bell |
| 4,822,100 A | 4/1989 | Bell |
| 4,874,205 A | 10/1989 | Arefinejad et al. |
| 4,919,482 A | 4/1990 | Landis et al. |
| 4,928,374 A | 5/1990 | Allen |
| 5,007,680 A | 4/1991 | Miyauchi et al. |
| 5,044,647 A | 9/1991 | Patterson |
| D325,801 S | 4/1992 | Fasth |
| 5,154,476 A | 10/1992 | Haider et al. |
| 5,158,389 A | 10/1992 | Osterwald et al. |
| 5,240,309 A | 8/1993 | Kojer |
| 5,248,184 A | 9/1993 | Morris |
| 5,265,937 A | 11/1993 | Allen |
| 5,380,060 A | 1/1995 | Sponsler et al. |
| 5,383,707 A | 1/1995 | Osenkowski et al. |
| 5,393,116 A | 2/1995 | Bolsworth et al. |
| 5,419,616 A | 5/1995 | Paetzold |
| 5,425,598 A | 6/1995 | Pennington |
| 5,435,624 A | 7/1995 | Bray et al. |
| 5,460,429 A | 10/1995 | Whalen |
| 5,476,307 A | 12/1995 | Whalen |
| 5,489,141 A | 2/1996 | Strausbaugh et al. |
| 5,492,389 A | 2/1996 | McClintock et al. |
| 5,548,096 A | 8/1996 | Akasaka et al. |
| 5,577,805 A | 11/1996 | Glinter et al. |
| 5,586,833 A | 12/1996 | Vossmann et al. |
| 5,590,932 A | 1/1997 | Olivieri |
| 5,603,550 A | 2/1997 | Holdampf et al. |
| 5,622,410 A | 4/1997 | Robinson |
| 5,628,215 A | 5/1997 | Brown |
| 5,634,689 A | 6/1997 | Putsch et al. |
| 5,660,440 A | 8/1997 | Pejathaya |
| 5,718,481 A | 2/1998 | Robinson |
| 5,749,625 A | 5/1998 | Robinson |
| 5,749,626 A | 5/1998 | Yoshida |
| 5,769,493 A | 6/1998 | Pejathaya |
| 5,788,330 A | 8/1998 | Ryan |
| 5,813,724 A | 9/1998 | Matsuura et al. |
| 5,823,622 A | 10/1998 | Fisher, IV et al. |
| 5,857,659 A | 1/1999 | Kato et al. |
| 5,915,779 A | 6/1999 | Duchateau |
| 5,918,939 A | 7/1999 | Magadanz |
| 5,927,809 A | 7/1999 | Tame |
| 5,938,286 A | 8/1999 | Jones et al. |
| 5,941,591 A | 8/1999 | Tsuge et al. |
| 5,947,560 A | 9/1999 | Chen |
| 5,951,108 A | 9/1999 | Bauer et al. |
| D415,847 S | 10/1999 | Schaefer |
| 5,979,986 A | 11/1999 | Pejathaya |
| 6,007,152 A | 12/1999 | Kojima et al. |
| 6,007,153 A | 12/1999 | Benoit et al. |
| 6,023,994 A | 2/2000 | Yoshida |
| 6,024,410 A | 2/2000 | Yoshida |
| 6,047,444 A | 4/2000 | Braun |
| 6,068,341 A | 5/2000 | Rink |
| 6,074,009 A | 6/2000 | Farino |
| 6,095,609 A | 8/2000 | Magadanz |
| 6,106,067 A | 8/2000 | Zhuang et al. |
| 6,123,380 A | 9/2000 | Sturt et al. |
| 6,139,104 A | 10/2000 | Brewer |
| 6,158,800 A | 12/2000 | Tsuge et al. |
| 6,161,899 A | 12/2000 | Yu |
| 6,199,953 B1 | 3/2001 | Chen |
| 6,250,704 B1 | 6/2001 | Garrido |
| 6,283,159 B1 | 9/2001 | Tada |
| 6,283,550 B1 | 9/2001 | Vialatte et al. |
| 6,290,297 B1 | 9/2001 | Yu |
| 6,328,381 B1 | 12/2001 | Smuk |
| 6,345,867 B1 | 2/2002 | Hellrung et al. |
| 6,378,920 B1 | 4/2002 | Ostrowski et al. |
| 6,390,557 B1 | 5/2002 | Asano |
| 6,447,066 B1 | 9/2002 | Chabanne et al. |
| 6,454,354 B1 | 9/2002 | Vossmann et al. |
| 6,488,338 B1 | 12/2002 | Hoshihara |
| 6,511,129 B1 | 1/2003 | Minor et al. |
| 6,533,357 B2 | 3/2003 | Pospeshil et al. |
| 6,540,272 B2 | 4/2003 | Spurr |
| 6,550,864 B1 | 4/2003 | Zarna et al. |
| 6,554,362 B1 | 4/2003 | Pospeshil |
| 6,634,713 B2 | 10/2003 | Nonomiya et al. |
| 6,669,296 B2 | 12/2003 | Moriyama et al. |
| 6,669,299 B2 | 12/2003 | Carlson et al. |
| 6,698,837 B2 | 3/2004 | Pejathaya et al. |
| 6,709,053 B1 | 3/2004 | Humer et al. |
| 6,733,078 B1 | 5/2004 | Zelmanov |
| 6,740,845 B2 | 5/2004 | Stol et al. |
| 6,758,525 B2 | 7/2004 | Uramichi |
| 6,836,951 B2 | 1/2005 | Dudash et al. |
| 6,854,802 B2 | 2/2005 | Matsuura et al. |
| 6,857,703 B2 | 2/2005 | Bonk |
| 6,860,562 B2 | 3/2005 | Bonk |
| 6,869,143 B2 | 3/2005 | Secord |
| D503,645 S | 4/2005 | Wirth et al. |
| 6,908,156 B1 | 6/2005 | Park et al. |
| 7,014,265 B2 | 3/2006 | Yamada et al. |
| 7,025,422 B2 | 4/2006 | Fast |
| 7,093,901 B2 | 8/2006 | Yamada |
| 7,093,902 B2 | 8/2006 | Lehmann et al. |
| 7,097,253 B2 | 8/2006 | Coughlin et al. |
| 7,100,987 B2 | 9/2006 | Volker et al. |
| 7,121,624 B2 | 10/2006 | Pejathaya et al. |
| 7,152,924 B1 | 12/2006 | Nemoto et al. |
| 7,154,065 B2 | 12/2006 | Martukanitz et al. |
| 7,172,253 B2 | 2/2007 | Haverkamp |
| 7,198,330 B2 | 4/2007 | Wahlen et al. |
| 7,293,838 B2 | 11/2007 | Sugama et al. |
| 7,296,857 B2 | 11/2007 | Shinozaki et al. |
| 7,300,109 B2 | 11/2007 | Hofmann et al. |
| 7,306,286 B2 | 12/2007 | Syrowik et al. |

(56) References Cited

U.S. PATENT DOCUMENTS

| | | | |
|---|---|---|---|
| 7,328,954 B2 | 2/2008 | Sasaki et al. | |
| 7,360,838 B2 | 4/2008 | Smuk | |
| 7,419,217 B2 | 9/2008 | Ishizuka | |
| 7,458,639 B2 | 12/2008 | Thiel et al. | |
| 7,490,907 B2 | 2/2009 | Nagura et al. | |
| 7,500,719 B2 | 3/2009 | Kojima | |
| 7,503,099 B2 | 3/2009 | Pejathaya | |
| 7,506,933 B2 | 3/2009 | Yamada et al. | |
| 7,513,573 B2 | 4/2009 | Wahls et al. | |
| 7,527,336 B2 | 5/2009 | Kienke et al. | |
| 7,578,556 B2 | 8/2009 | Ohba et al. | |
| 7,604,297 B2 | 10/2009 | Weber | |
| 7,695,068 B2 | 4/2010 | Maeda et al. | |
| 7,775,591 B2 | 8/2010 | Hahn et al. | |
| 7,775,594 B2 | 8/2010 | Bruck et al. | |
| 7,837,266 B2 | 11/2010 | Lehmann | |
| 7,871,128 B2 | 1/2011 | Bonk et al. | |
| 7,976,103 B2 | 7/2011 | Gamache et al. | |
| 8,029,030 B2 | 10/2011 | Shimura et al. | |
| 8,052,215 B2 | 11/2011 | Ito | |
| 8,128,169 B2 | 3/2012 | Narita et al. | |
| D666,330 S | 8/2012 | Stamper | |
| 8,360,527 B2 | 1/2013 | Lehmann | |
| 8,430,454 B2 | 4/2013 | Tanguy et al. | |
| 8,449,034 B2 | 5/2013 | Tame et al. | |
| 8,602,497 B2 | 12/2013 | Zhang et al. | |
| 8,727,442 B2 * | 5/2014 | Runde | B60N 2/22 |
| | | | 297/378.12 |
| 8,845,019 B2 | 9/2014 | Sawada | |
| 8,985,690 B2 | 3/2015 | Yamada et al. | |
| 9,102,248 B2 | 8/2015 | Matt | |
| 9,108,541 B2 | 8/2015 | Assmann et al. | |
| D745,299 S | 12/2015 | Chang | |
| 9,221,364 B2 | 12/2015 | Nock et al. | |
| 9,227,532 B2 | 1/2016 | Balzar et al. | |
| 9,296,315 B2 | 3/2016 | Hellrung | |
| 9,346,376 B2 | 5/2016 | Hiemstra | |
| D764,140 S | 8/2016 | Holzhaeuser | |
| 9,475,409 B2 | 10/2016 | Jiang et al. | |
| 9,493,097 B2 | 11/2016 | Pejathaya | |
| 9,511,693 B2 | 12/2016 | Nakagawa et al. | |
| 9,527,410 B2 | 12/2016 | Leconte | |
| 9,527,419 B2 | 12/2016 | Hosbach et al. | |
| 9,555,725 B2 | 1/2017 | Rothstein et al. | |
| 9,573,493 B2 | 2/2017 | Nagura et al. | |
| 9,616,779 B2 | 4/2017 | Barzen et al. | |
| 9,623,774 B2 | 4/2017 | Yamada et al. | |
| D786,172 S | 5/2017 | Komazaki et al. | |
| D787,421 S | 5/2017 | Komazaki et al. | |
| D788,018 S | 5/2017 | Komazaki et al. | |
| 9,701,222 B2 | 7/2017 | Kitou | |
| 9,751,432 B2 | 9/2017 | Assmann | |
| 9,873,357 B1 | 1/2018 | McCulloch et al. | |
| D809,994 S | 2/2018 | Braddock, III | |
| 9,889,774 B2 | 2/2018 | Espinosa et al. | |
| 9,994,129 B1 | 6/2018 | Shirokane | |
| 10,065,537 B2 | 9/2018 | Noguchi et al. | |
| 10,065,538 B2 | 9/2018 | Desquesne et al. | |
| 10,071,656 B2 | 9/2018 | Wetzig | |
| 10,150,387 B2 | 12/2018 | Hiemstra et al. | |
| 10,279,709 B2 | 5/2019 | Suzuki et al. | |
| 10,399,466 B2 | 9/2019 | Chang | |
| 10,610,018 B1 | 4/2020 | Madhu | |
| 10,787,098 B2 | 9/2020 | Smuk | |
| 10,800,296 B2 | 10/2020 | Schmitz et al. | |
| 10,864,830 B2 | 12/2020 | Schmitz et al. | |
| 11,052,797 B2 | 7/2021 | Poptani et al. | |
| 11,110,819 B2 | 9/2021 | Barzen et al. | |
| 11,364,577 B2 | 6/2022 | Schmitz et al. | |
| 11,766,957 B2 * | 9/2023 | Naik | B60N 2/20 |
| | | | 297/362.11 |
| 11,897,372 B2 * | 2/2024 | Schmitz | B60N 2/20 |
| 2002/0000746 A1 | 1/2002 | Matsuura et al. | |
| 2002/0014797 A1 | 2/2002 | Dudash et al. | |
| 2002/0043852 A1 | 4/2002 | Uramichi | |

| | | |
|---|---|---|
| 2003/0127898 A1 | 7/2003 | Niimi et al. |
| 2003/0178879 A1 | 9/2003 | Uramichi |
| 2003/0230923 A1 | 12/2003 | Uramichi |
| 2004/0021357 A1 | 2/2004 | Denning |
| 2004/0084945 A1 | 5/2004 | Toba et al. |
| 2004/0134055 A1 | 7/2004 | Aizaki |
| 2004/0145226 A1 | 7/2004 | Bonk |
| 2004/0195889 A1 | 10/2004 | Secord |
| 2005/0017057 A1 | 1/2005 | Motomi et al. |
| 2005/0029806 A1 | 2/2005 | Yamanashi et al. |
| 2005/0253439 A1 | 11/2005 | Sasaki et al. |
| 2006/0006718 A1 | 1/2006 | Umezaki |
| 2006/0012232 A1 | 1/2006 | Coughlin et al. |
| 2006/0013646 A1 | 1/2006 | Baulier et al. |
| 2006/0055223 A1 | 3/2006 | Thiel et al. |
| 2006/0170269 A1 | 8/2006 | Oki |
| 2006/0202537 A1 | 9/2006 | Smuk |
| 2007/0138854 A1 | 6/2007 | Paing et al. |
| 2007/0145800 A1 | 6/2007 | Thiel et al. |
| 2007/0152484 A1 | 7/2007 | Palomba et al. |
| 2007/0200408 A1 | 8/2007 | Ohta et al. |
| 2008/0001458 A1 | 1/2008 | Hoshihara et al. |
| 2008/0053098 A1 | 3/2008 | Morenko et al. |
| 2008/0054151 A1 | 3/2008 | Shimura et al. |
| 2008/0073961 A1 | 3/2008 | Wahls et al. |
| 2008/0164741 A1 | 7/2008 | Sakamoto |
| 2008/0185892 A1 | 8/2008 | Peters et al. |
| 2008/0231103 A1 | 9/2008 | Rohee |
| 2009/0001797 A1 | 1/2009 | Neumann |
| 2009/0033138 A1 | 2/2009 | Yamada et al. |
| 2009/0056124 A1 | 3/2009 | Krebs et al. |
| 2009/0072601 A1 | 3/2009 | Geisler et al. |
| 2009/0072602 A1 | 3/2009 | Schuler |
| 2009/0134682 A1 | 5/2009 | Andou et al. |
| 2009/0140565 A1 | 6/2009 | Wahls et al. |
| 2009/0250989 A1 | 10/2009 | Endo et al. |
| 2009/0250990 A1 | 10/2009 | Endo et al. |
| 2009/0289488 A1 | 11/2009 | Mitsuhashi |
| 2009/0302658 A1 | 12/2009 | Fassbender et al. |
| 2010/0072802 A1 | 3/2010 | Smith et al. |
| 2010/0096892 A1 | 4/2010 | Meghira et al. |
| 2010/0096896 A1 | 4/2010 | Nonomiya |
| 2010/0109408 A1 | 5/2010 | Ohba |
| 2010/0117429 A1 | 5/2010 | Mitsuhashi |
| 2010/0127546 A1 | 5/2010 | Dziedzic |
| 2010/0150645 A1 | 6/2010 | Endo et al. |
| 2010/0176621 A1 | 7/2010 | Aufrere et al. |
| 2010/0194165 A1 | 8/2010 | Iguchi |
| 2010/0231021 A1 | 9/2010 | Myers et al. |
| 2010/0231022 A1 | 9/2010 | Kim et al. |
| 2010/0244530 A1 | 9/2010 | Kitano et al. |
| 2010/0276976 A1 | 11/2010 | Kumazaki et al. |
| 2010/0283304 A1 | 11/2010 | Thiel |
| 2010/0308634 A1 | 12/2010 | Narita et al. |
| 2010/0308635 A1 | 12/2010 | Tame et al. |
| 2010/0320823 A1 | 12/2010 | Thiel |
| 2011/0001346 A1 | 1/2011 | Yamada et al. |
| 2011/0025114 A1 | 2/2011 | Berndtson et al. |
| 2011/0068612 A1 | 3/2011 | Thiel |
| 2011/0127814 A1 | 6/2011 | Thiel |
| 2011/0169314 A1 | 7/2011 | Tanguy et al. |
| 2011/0227386 A1 | 9/2011 | Berndtson et al. |
| 2011/0309665 A1 | 12/2011 | Leighton et al. |
| 2012/0086253 A1 | 4/2012 | Nock et al. |
| 2012/0161488 A1 | 6/2012 | Ishihara et al. |
| 2012/0169102 A1 | 7/2012 | Hiemstra et al. |
| 2012/0242133 A1 | 9/2012 | Jaudouin et al. |
| 2012/0248841 A1 | 10/2012 | Hellrung et al. |
| 2012/0261976 A1 | 10/2012 | Uebelacker et al. |
| 2012/0279337 A1 | 11/2012 | Endo et al. |
| 2012/0280555 A1 | 11/2012 | Blinzler et al. |
| 2012/0292970 A1 | 11/2012 | Yamada et al. |
| 2012/0301212 A1 | 11/2012 | Champ et al. |
| 2012/0306251 A1 | 12/2012 | Arefi et al. |
| 2012/0313415 A1 | 12/2012 | Nonomiya et al. |
| 2013/0026808 A1 | 1/2013 | Uramichi et al. |
| 2013/0076094 A1 | 3/2013 | Ishihara et al. |
| 2013/0113261 A1 | 5/2013 | Mikasa et al. |
| 2013/0129413 A1 | 5/2013 | Dryburgh et al. |

(56) References Cited

U.S. PATENT DOCUMENTS

| | | |
|---|---|---|
| 2013/0154331 A1 | 6/2013 | Ito |
| 2013/0161994 A1 | 6/2013 | Ito |
| 2013/0161995 A1 | 6/2013 | Yamada et al. |
| 2013/0187417 A1 | 7/2013 | Seo et al. |
| 2013/0207434 A1 | 8/2013 | Stilleke et al. |
| 2013/0233435 A1 | 9/2013 | Henthorn et al. |
| 2013/0270884 A1 | 10/2013 | Espinosa et al. |
| 2013/0291676 A1 | 11/2013 | Pleskot et al. |
| 2013/0313395 A1 | 11/2013 | Blake et al. |
| 2014/0001806 A1 | 1/2014 | Golarz |
| 2014/0008956 A1 | 1/2014 | Golarz et al. |
| 2014/0008958 A1 | 1/2014 | Ito |
| 2014/0091607 A1 | 4/2014 | Maeda |
| 2014/0103693 A1 | 4/2014 | Yamada et al. |
| 2014/0138998 A1 | 5/2014 | Christoffel et al. |
| 2014/0152067 A1 | 6/2014 | Pleskot et al. |
| 2014/0159458 A1 | 6/2014 | Lu et al. |
| 2014/0225411 A1 | 8/2014 | Matt |
| 2014/0232163 A1 | 8/2014 | Eckhoff et al. |
| 2014/0239691 A1 | 8/2014 | Hellrung |
| 2014/0239693 A1 | 8/2014 | Nock et al. |
| 2014/0301682 A1 | 10/2014 | Leppla |
| 2015/0015044 A1 | 1/2015 | Teufel et al. |
| 2015/0042133 A1 | 2/2015 | Munemura et al. |
| 2015/0069809 A1 | 3/2015 | Matt |
| 2015/0091346 A1 | 4/2015 | Kitou |
| 2015/0091354 A1 | 4/2015 | Enokijima et al. |
| 2015/0123444 A1 | 5/2015 | Assmann |
| 2015/0165936 A1 | 6/2015 | Wei et al. |
| 2015/0266398 A1 | 9/2015 | Higashi et al. |
| 2015/0273548 A1 | 10/2015 | Tanoue et al. |
| 2015/0306986 A1 | 10/2015 | Jarry et al. |
| 2015/0321585 A1 | 11/2015 | McCulloch et al. |
| 2016/0009202 A1 | 1/2016 | Pejathaya |
| 2016/0023577 A1 | 1/2016 | Yamada et al. |
| 2016/0046211 A1 | 2/2016 | Assmann |
| 2016/0107546 A1 | 4/2016 | Barzen et al. |
| 2016/0211491 A1 | 7/2016 | Iwasaki et al. |
| 2016/0272089 A1 | 9/2016 | Kim et al. |
| 2016/0339810 A1 | 11/2016 | Pluta et al. |
| 2017/0021743 A1 | 1/2017 | Hiemstra et al. |
| 2017/0037945 A1 | 2/2017 | Maeda et al. |
| 2017/0058940 A1 | 3/2017 | Wehner et al. |
| 2017/0080828 A1 | 3/2017 | Aktas |
| 2017/0088021 A1 | 3/2017 | Noguchi et al. |
| 2017/0120398 A1 | 5/2017 | Veldsman et al. |
| 2017/0136921 A1 | 5/2017 | Dill et al. |
| 2017/0151893 A1 | 6/2017 | Kojima et al. |
| 2017/0158091 A1 | 6/2017 | Kojima et al. |
| 2017/0158092 A1 | 6/2017 | Kojima et al. |
| 2017/0253151 A1 | 9/2017 | Maeda et al. |
| 2017/0253152 A1 | 9/2017 | Maeda et al. |
| 2018/0043800 A1 | 2/2018 | Maeda et al. |
| 2018/0056819 A1 | 3/2018 | Schmitz et al. |
| 2018/0103760 A1 | 4/2018 | Fujita et al. |
| 2018/0154802 A1 | 6/2018 | Ito |
| 2018/0208087 A1 | 7/2018 | Baba et al. |
| 2018/0213936 A1 | 8/2018 | Sasaki et al. |
| 2018/0238474 A1 | 8/2018 | Braddock, III |
| 2018/0281622 A1 | 10/2018 | Barzen et al. |
| 2018/0290565 A1 | 10/2018 | Tone et al. |
| 2018/0334060 A1 | 11/2018 | Yamabe |
| 2018/0339613 A1 | 11/2018 | Mizobata |
| 2018/0361886 A1 | 12/2018 | Chang |
| 2019/0111523 A1 | 4/2019 | Pham |
| 2019/0255979 A1 | 8/2019 | Zahn et al. |
| 2019/0299821 A1 | 10/2019 | Maeda et al. |
| 2019/0329674 A1 | 10/2019 | Schmitz et al. |
| 2019/0337424 A1 | 11/2019 | Chang |
| 2019/0358694 A1 | 11/2019 | Yamakita |
| 2020/0047644 A1 | 2/2020 | Schmitz et al. |
| 2020/0070689 A1 | 3/2020 | Naik et al. |
| 2020/0164775 A1 | 5/2020 | Chang |
| 2020/0231070 A1 | 7/2020 | Schmitz et al. |
| 2020/0253380 A1 | 8/2020 | Schmitz et al. |
| 2020/0282879 A1 | 9/2020 | Schmitz et al. |
| 2020/0290486 A1 | 9/2020 | Sung |
| 2020/0331367 A1 | 10/2020 | Schmitz et al. |
| 2020/0361033 A1 | 11/2020 | Owaki et al. |
| 2021/0008665 A1 | 1/2021 | Brugger |
| 2021/0039528 A1 | 2/2021 | Poptani et al. |
| 2021/0061139 A1 | 3/2021 | Schmitz et al. |
| 2021/0276461 A1 | 9/2021 | Schmitz et al. |
| 2022/0355711 A1 | 11/2022 | Schmitz et al. |

FOREIGN PATENT DOCUMENTS

| | | |
|---|---|---|
| CA | 2869816 A1 | 10/2013 |
| CN | 1291566 A | 4/2001 |
| CN | 1457306 A | 11/2003 |
| CN | 1840382 A | 10/2006 |
| CN | 1907752 A | 2/2007 |
| CN | 101148152 A | 3/2008 |
| CN | 101568447 A | 10/2009 |
| CN | 101616820 A | 12/2009 |
| CN | 101925485 A | 12/2010 |
| CN | 102126451 A | 7/2011 |
| CN | 102131673 A | 7/2011 |
| CN | 202086037 U | 12/2011 |
| CN | 102442228 A | 5/2012 |
| CN | 102649403 A | 8/2012 |
| CN | 102666190 A | 9/2012 |
| CN | 102729857 A | 10/2012 |
| CN | 102951043 A | 3/2013 |
| CN | 103025567 A | 4/2013 |
| CN | 103025568 A | 4/2013 |
| CN | 103240527 A | 8/2013 |
| CN | 103298652 A | 9/2013 |
| CN | 203228664 U | 10/2013 |
| CN | 203381519 U | 1/2014 |
| CN | 103702860 A | 4/2014 |
| CN | 103857314 A | 6/2014 |
| CN | 203974603 U | 12/2014 |
| CN | 105189196 A | 12/2015 |
| CN | 205097989 U | 3/2016 |
| CN | 205130981 U | 4/2016 |
| CN | 106799978 A | 6/2017 |
| CN | 107364369 A | 11/2017 |
| CN | 107428269 A | 12/2017 |
| CN | 107435472 A | 12/2017 |
| CN | 107598373 A | 1/2018 |
| CN | 107972542 A | 5/2018 |
| CN | 207291755 U | 5/2018 |
| CN | 108263253 A | 7/2018 |
| CN | 108555547 A | 9/2018 |
| CN | 108688517 A | 10/2018 |
| CN | 109515263 A | 3/2019 |
| CN | 109562707 A | 4/2019 |
| CN | 110395151 A | 11/2019 |
| CN | 110871716 A | 3/2020 |
| CN | 112339625 A | 2/2021 |
| DE | 907608 C | 3/1954 |
| DE | 1098292 B | 1/1961 |
| DE | 3130314 A1 | 2/1983 |
| DE | 4324734 A1 | 1/1995 |
| DE | 10105282 A1 | 8/2002 |
| DE | 20220200 U1 | 2/2004 |
| DE | 102007002366 B3 | 7/2008 |
| DE | 102007009172 A1 | 8/2008 |
| DE | 202008003706 U1 | 7/2009 |
| DE | 102008026176 A1 | 12/2009 |
| DE | 102008029438 A1 | 12/2009 |
| DE | 102008047660 A1 | 4/2010 |
| DE | 102009040504 A1 | 4/2010 |
| DE | 102010038795 A1 | 2/2012 |
| DE | 102011015139 A1 | 4/2012 |
| DE | 102010056378 A1 | 6/2012 |
| DE | 102011013163 A1 | 9/2012 |
| DE | 102011075364 A1 | 11/2012 |
| DE | 102012009159 A1 | 11/2012 |
| DE | 102011108976 A1 | 1/2013 |
| DE | 102012000296 A1 | 4/2013 |
| DE | 102012008940 A1 | 11/2013 |
| DE | 102014219168 A1 | 4/2015 |

(56) References Cited

FOREIGN PATENT DOCUMENTS

| | | | |
|------|------------------|----|---------|
| DE | 102014207363 | A1 | 8/2015 |
| DE | 112014000343 | T5 | 9/2015 |
| DE | 102017100374 | A1 | 7/2017 |
| DE | 202018105268 | U1 | 9/2018 |
| DE | 202018107311 | U1 | 2/2019 |
| DE | 102019110151 | A1 | 10/2019 |
| EP | 1074426 | A2 | 2/2001 |
| EP | 3339017 | A1 | 6/2018 |
| FR | 73767 | E | 1/1961 |
| FR | 2947747 | A3 | 1/2011 |
| GB | 1136097 | A | 12/1968 |
| GB | 1526861 | A | 10/1978 |
| GB | 1546104 | A | 5/1979 |
| GB | 2441871 | A | 3/2008 |
| GB | 2503957 | A | 1/2014 |
| JP | 2000084684 | A | 3/2000 |
| JP | 2000153327 | A | 6/2000 |
| JP | 2001186957 | A | 7/2001 |
| JP | 2002119349 | A | 4/2002 |
| JP | 2007229055 | A | 9/2007 |
| JP | 2008043986 | A | 2/2008 |
| JP | 5290789 | B2 | 9/2013 |
| JP | 5555969 | B2 | 7/2014 |
| KR | 20030092869 | A | 12/2003 |
| KR | 100601809 | B1 | 7/2006 |
| KR | 20070119332 | A | 12/2007 |
| KR | 100817000 | B1 | 3/2008 |
| KR | 20090035633 | A | 4/2009 |
| KR | 20140001651 | A | 1/2014 |
| KR | 101420164 | B1 | 7/2014 |
| KR | 101655777 | B1 | 9/2016 |
| WO | 9620848 | A1 | 7/1996 |
| WO | 2006069630 | A2 | 7/2006 |
| WO | 2008-130075 | A1 | 10/2008 |
| WO | 2011069107 | A2 | 6/2011 |
| WO | 2013133245 | A1 | 9/2013 |
| WO | 2013152433 | A1 | 10/2013 |
| WO | 2013167240 | A1 | 11/2013 |
| WO | 2014087084 | A1 | 6/2014 |
| WO | 2015012287 | A1 | 1/2015 |
| WO | 2016115986 | A1 | 7/2016 |
| WO | 2017118496 | A1 | 7/2017 |
| WO | 2021020580 | A1 | 2/2021 |

OTHER PUBLICATIONS

German Office Action regarding Patent Application No. 102019110151.4, dated Nov. 2, 2023.

First Chinese Office Action regarding Application No. 202210140495.2, dated Oct. 10, 2023.

First German Office Action regarding German Application No. 102021201936.6, mailed Feb. 8, 2024.

Office Action regarding German Patent Application No. 102015110762.7, dated Jan. 5, 2021. Translation provided by Witte, Weller & Partner Patentanwälte mbB.

Office Action regarding Indian Patent Application No. 202021025905, dated Jan. 28, 2022.

First Chinese Office Action regarding Patent Application No. 202110674360.X, dated Oct. 27, 2023.

Final Office Action regarding U.S. Appl. No. 17/836,780 dated Sep. 11, 2025.

Non-Final Office Action regarding U.S. Appl. No. 17/836,780 dated May 30, 2025.

Office Action regarding Canadian Patent Application No. 2,812,408, dated Jun. 17, 2016.

Office Action regarding German Patent Application No. 102016114406.1, dated Apr. 27, 2020. Translation provided by Witte, Weller & Partner Patentanwälte mbB.

International Search Report regarding International Application No. PCT/US2020/021377, dated Jun. 30, 2020.

Written Opinion of the International Searching Authority regarding International Application No. PCT/US2020/021377, dated Jun. 30, 2020.

Office Action regarding German Patent Application No. 102020208717.2, dated Feb. 16, 2021.

Office Action regarding German Patent Application No. 102019211855.0, dated Feb. 4, 2021. Partial translation provided by Bardehle Pagenberg Partnerschaft mbB.

SPI Lasers UK Ltd., "Opening new possibilities with single mode oscillation welding (CW)." Presented at: Laser World of Photonics China; Shanghai, China (Mar. 2008).

Office Action regarding German Patent Application No. 102019212517.4, dated Mar. 11, 2021. Partial translation provided by Bardehle Pagenberg Partnerschaft mbB.

Office Action regarding Indian Patent Application No. 201921032346, dated Mar. 18, 2021.

Office Action regarding Chinese Patent Application No. 201910334168.9, dated Apr. 30, 2021. Translation provided by Unitalen Attorneys at Law.

Office Action regarding German Patent Application No. 102013103671.6, dated May 20, 2021. Translation provided by Witte, Weller & Partner Patentanwälte mbB.

First Chinese Office Action regarding Application No. 201910801476.8 dated Aug. 10, 2021. English translation provided by Unitalen Attorneys at Law.

Office Action regarding U.S. Appl. No. 16/996,991, dated Sep. 9, 2021.

Notice of Allowance regarding U.S. Appl. No. 16/996,991, dated Oct. 4, 2021.

Office Action regarding U.S. Appl. No. 16/542,369, dated Jul. 16, 2021.

Office Action regarding U.S. Appl. No. 16/542,369, dated May 17, 2021.

Notice of Allowance regarding U.S. Appl. No. 16/542,369, dated Oct. 10, 2021.

Office Action regarding U.S. Appl. No. 16/842,135, dated Sep. 16, 2021.

Office Action regarding U.S. Appl. No. 16/740,874, dated Apr. 26, 2021.

Office Action regarding U.S. Appl. No. 16/740,874, dated Aug. 16, 2021.

Office Action regarding U.S. Appl. No. 16/811,112, dated Sep. 3, 2021.

Office Action regarding German Application No. 102019110151.4, dated Jul. 12, 2021.

Office Action regarding German Patent Application No. 102020200559.1, dated Jul. 23, 2021.

Office Action regarding Chinese Patent Application No. 201910725351.1, dated Jul. 5, 2021.

Office Action regarding U.S. Appl. No. 16/740,874, dated Oct. 20, 2021.

Office Action regarding German Patent Application No. 10 2019 211 855.0, dated Nov. 25, 2021.

Office Action regarding Chinese Patent Application No. 2021120202214440, dated Dec. 7, 2021.

Office Action regarding Chinese Patent Application No. 201910801476.8, dated Dec. 17, 2021.

Office Action regarding Chinese Patent Application No. 202010305091.5, dated Jan. 27, 2022. Translation provided by Unitalen Attorneys at Law.

Non-Final Office Action regarding U.S. Appl. No. 17/181,189 dated May 19, 2022.

Office Action regarding German Patent Application 10 2020 204 814.2 dated Jun. 8, 2022.

Office Action regarding Chinese Patent Application No. 2020103050915, dated Jun. 23, 2022.

Office Action regarding Chinese Patent Application No. 020107827129, dated Jun. 1, 2022.

Office Action regarding U.S. Appl. No. 16/842,135, dated Aug. 26, 2022.

German Office Action regarding Patent Application No. 1020161144061, dated Nov. 9, 2022.

Chinese Office Action regarding Patent Application No. 2021102452677, dated Oct. 28, 2022.

Chinese Office Action regarding Application No. 202010885551.6, dated Jul. 21, 2022.

(56)         References Cited

OTHER PUBLICATIONS

Final Office Action regarding U.S. Appl. No. 16/842,135 dated Feb. 17, 2023.
Office Action regarding U.S. Appl. No. 17/720,609 dated May 17, 2023.
German Office Action regarding Patent Application No. 102022201243.7, dated May 12, 2023.
Non-Final Office Action regarding U.S. Appl. No. 16/842,135 dated May 26, 2023.
Notice of Allowance regarding U.S. Appl. No. 17/586,203, dated Jul. 26, 2023.
Notice of Allowance regarding U.S. Appl. No. 17/824,027 dated Aug. 30, 2023.
Notice of Allowance regarding U.S. Appl. No. 16/842, 135 dated Sep. 20, 2023.
Notice of Allowance regarding U.S. Appl. No. 17/824,027 dated Sep. 25, 2023.
Office Action regarding German Patent Application No. 10 2019 211 855.0, dated Nov. 3, 2021.
Notice of Allowance regarding U.S. Appl. No. 16/542,369, dated Oct. 5, 2021.
Office Action regarding Chinese Patent Application No. 202010082469.X, dated Dec. 7, 2021.
Office Action regarding Chinese Patent Application No. 2020107827129, dated Jun. 1, 2022.
German Office Action regarding Application No. 1020202107068, dated Oct. 17, 2023.
Office Action regarding Chinese Patent Application No. 2022107226709, dated Mar. 28, 2025 [Translation provided by Unitalen].
Non-Final Office Action regarding U.S. Appl. No. 17/836,780 dated Dec. 17, 2025.
Office Action regarding U.S. Appl. No. 15/437,877, dated Dec. 31, 2018.
Office Action regarding German Patent Application No. 10 2020 200 019.0, dated Jul. 27, 2021.
Office Action regarding Chinese Patent Application No. 202010014433.8, dated Nov. 26, 2021.
German Office Action for German Patent Application No. 10 2017 119 166.6 dated Jan. 21, 2022.
Office Action regarding Chinese Patent Application No. 2020100144338, dated Jun. 29, 2022.
Chinese Office Action regarding Patent Application No. 2020100144338, dated Oct. 13, 2022.
Non-Final Office Action regarding U.S. Appl. No. 17/720,636 dated Apr. 26, 2023.
Chinese Office Action regarding Patent Application No. 202210481866.3, dated Jun. 1, 2023.
First Examination Report issued on Jul. 26, 2023 by the German Patent and Trademark Office for German Application No. 102022204380.4.
Final Office Action regarding U.S. Appl. No. 17/720,636 dated Oct. 5, 2023.
Chinese Office Action regarding Patent Application No. 202210481866.3, dated Dec. 19, 2023.
Second German Office Action regarding Patent Application No. 102020200019, dated Jan. 31, 2024.
Non-Final Office Action regarding U.S. Appl. No. 17/720,636 dated Apr. 5, 2024.
German Office Action regarding German Application No. 102017119166.6, mailed Apr. 25, 2024.
Notice of Allowance regarding U.S. Appl. No. 17/720,636 dated Sep. 5, 2024.
Office Action regarding German Patent Application No. 1020171191666, dated Dec. 3, 2024 [Translation provided by Witte, Weller & Partner].
First Chinese Office Action (with English translation) regarding Chinese Application No. 202210655080.9, mailed Jul. 20, 2024.
Office Action regarding German Patent Application No. 1020241220090, Sep. 23, 2025 [Google translation].
Second Chinese Office Action regarding Patent Application No. 202110674360.X, dated May 30, 2024.

\* cited by examiner

CLIP FOR VEHICLE SEAT CABLE ASSEMBLY

CROSS-REFERENCE TO RELATED APPLICATIONS

This application claims the benefit of U.S. Provisional Application No. 63/544,851, filed on Oct. 19, 2023. The entire disclosure of the above application is incorporated herein by reference.

FIELD

The present disclosure relates to a vehicle seat assembly, and more particularly, to a clip for a vehicle seat release cable of the vehicle seat assembly.

BACKGROUND

This section provides background information related to the present disclosure and is not necessarily prior art.

Vehicles such as automobiles, for example, typically include at least one seat assembly that is moveable in one or more directions (e.g., fore-aft, up-down, angular, etc.) relative to a floor of the vehicle. An occupant of the vehicle may adjust the seat's position to suit the occupant's preferences for comfort and/or functionality. A seat assembly for a second and/or third row of seats may be adjusted to permit easy ingress and/or egress from the vehicle.

A seat assembly may include a cable assembly that cooperates with other components in the seat assembly to release and/or move the seat from a first position to a second position. The cable assembly may include a cable, such as a vehicle seat release cable, and a plurality of clips that are engaged with structural and/or locking features of the seat assembly.

The plurality of clips may include a first clip and a second clip. The first clip is slidably engaged on a cable of the cable assembly. The first clip is removably engaged with a structural and/or locking feature of the seat assembly to retain the cable assembly in the install position. It is desirable to control the dimension or length of the cable between the first clip and an end of the cable during installation in the seat assembly. Maintaining a precise length between the end of the cable and the first clip may be difficult when installing the cable into the seat assembly because the first clip can slide across the cable when it is not retained in the locking feature. When the length of the cable between the end of the cable and the first clip is greater than a critical length, there may be extra slack in the cable assembly preventing the cable assembly from properly cooperating with the locking features to perform the releasing and/or moving functions of the seat assembly. In contrast, when the length between the end of the cable and the first clip is less than a critical length, the cable may be too tight thus preventing the locking features from staying locked. In other words, if the cable is too tight, a seat back and/or a seat bottom may not stay engaged in their respective locked positions.

To control the length of the cable during installation, a manual tool may be used to position and install the end of the cable and the first clip such that the desired length between the first clip and the end of the cable is achieved. This installation method is tedious, time consuming, and subject to operator inconsistency and error.

The present disclosure provides a cable assembly for a seat assembly including a removable clip that is configured to position the first clip and the end of the cable during installation such that the desired length between the end of the cable and the first clip is achieved. The present disclosure also provides a method for installing the cable assembly onto the seat assembly.

SUMMARY

This section provides a general summary of the disclosure and is not a comprehensive disclosure of its full scope or all of its features.

The present disclosure provides a cable assembly for a vehicle seat assembly. The cable assembly may include a cable, a first clip, and a second clip. The cable may include a first end and an end cap disposed thereon. The first clip may be slidingly engaged on the cable. The first clip may include a first body including a distal portion and an attachment portion. The first body may define an aperture in the attachment portion. At least a first portion of the cable may extend through the aperture. The second clip may be configured to be removably engaged to the first clip. The second clip may include a second body, a first wall, and sidewalls extending perpendicularly from the first wall. The first wall may cooperate with the sidewalls to define an outer surface and an inner surface. A first portion of the second clip may extend longitudinally from the second body. The cable may have a first dimension that extends between a first side of the first clip and the end cap. The first portion of the second clip may have a second dimension that is the same as the first dimension.

In some configurations of the cable assembly of the above paragraph, the second clip may include a second portion and a third portion. Each of the second portion and the third portion may define a first recess. The first recess may include a pair of retention features.

In some configurations of the cable assembly of either of the above paragraphs, the attachment portion may include a first protrusion and a second protrusion opposite the first protrusion.

In some configurations of the cable assembly of any one or more of the above paragraphs, the retention features may be configured to engage a surface of each of the first protrusion and the second protrusion to restrict the removal of the second clip from the first clip in an install position.

In some configurations of the cable assembly of any one or more of the above paragraphs, the attachment portion of the first clip may at least partially contact the inner surface of the second clip.

In some configurations of the cable assembly of any one or more of the above paragraphs, the first portion may include a second recess. A second portion of the cable may be at least partially disposed in the second recess.

In some configurations of the cable assembly of any one or more of the above paragraphs, the distal portion of the first clip may define a groove thereon.

In some configurations of the cable assembly of any one or more of the above paragraphs, the distal portion may be configured to be removably engaged with a portion of a locking mechanism of the seat assembly.

In some configurations of the cable assembly of any one or more of the above paragraphs, the end cap may be configured to be removably engaged with a portion of the locking mechanism of the seat assembly.

In some configurations of the cable assembly of any one or more of the above paragraphs, the second clip may include a polymer material.

The present disclosure also provides a vehicle seat assembly. The vehicle seat assembly may include a seat including a seatback and a seat bottom. The seat assembly may include at least on seat adjustment assembly that may be configured to move the seatback from a first position to a second position. The seat adjustment assembly may include a locking mechanism and a cable assembly. The cable assembly may include a cable, a first clip, and a second clip. The cable may include a first end and an end cap disposed thereon. The first clip may be slidingly engaged on the cable. The first clip may include a first body including a distal portion and an attachment portion. The first body may define an aperture in the first portion. At least a first portion of the cable may extend through the aperture. The second clip may be configured to be removably engaged to the first clip. The second clip may include a second body, a first wall, and sidewalls extending perpendicularly from the first wall. The first wall may cooperate with the sidewalls to define an outer surface and an inner surface. A first portion of the second clip may extend longitudinally from the second body. The cable may have a first dimension that extends between a first side of the first clip and the end cap. The first portion of the second clip may have a second dimension that is the same as the first dimension.

In some configurations of the seat assembly of the above paragraph, the second clip may further include a second portion and a third portion. Each of the second portion and the third portion may define a first recess. The first recess may include a pair of retention features.

In some configurations of the seat assembly of either of the above paragraphs, the attachment portion of the first clip may include a first protrusion and a second protrusion opposite the first protrusion.

In some configurations of the seat assembly of any one or more of the above paragraphs, the retention features may be configured to engage a surface of each of the first protrusion and the second protrusion and restrict the removal of the second clip from the first clip in an install position.

In some configurations of the seat assembly of any one or more of the above paragraphs, the first portion may include a first recess. A second portion of the cable may be at least partially disposed in the second recess.

In some configurations of the seat assembly of any one or more of the above paragraphs, the cable assembly may be mounted to the seatback. The seat adjustment assembly may be configured to move the seatback in a first direction relative to the seat bottom.

In some configurations of the seat assembly of any one or more of the above paragraphs, the cable assembly may be mounted to the seat bottom. The seat adjustment assembly may be configured to move the seat bottom in a first direction relative to a vehicle floor.

The present disclosure also provides a method of installing a cable assembly into a seat assembly. The method may include: installing a first end of a cable of the cable assembly into a first portion of a locking mechanism; installing a first clip of the cable assembly into a second portion of the locking mechanism; and removing a second clip from the first clip. The cable may include an end cap disposed on the first end. The first clip may include a distal portion and an attachment portion. The distal portion may be disposed in the second portion of the locking mechanism. The second clip may be removably engaged to the attachment portion of the first clip. The second clip may include a body, a first wall, and sidewalls extending perpendicularly from the first wall. The first wall may cooperate with the sidewalls to define an outer surface and an inner surface. A first portion of the second clip may extend longitudinally from the body. The cable may have a first dimension between a first side of the first clip and the end cap. The first portion of the second clip may have a second dimension that is the same as the first dimension.

In some configurations of the method of the above paragraph, the method further includes confirming that the second clip was removed from the installed cable assembly.

In some configurations of the method of either of the above paragraphs, the confirming includes detecting whether the second clip is present using a camera detection system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figures 1, 2, 3:
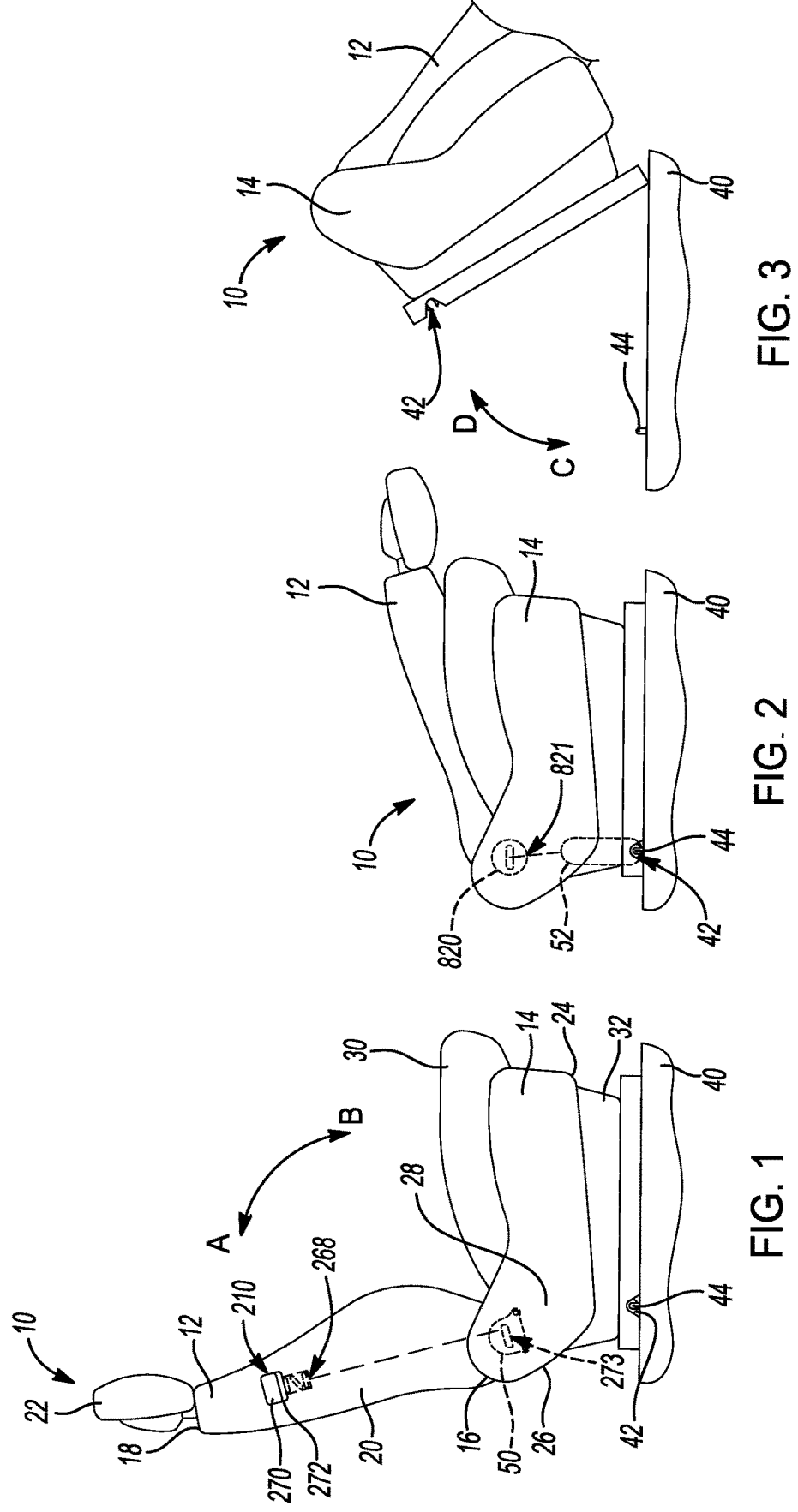
FIG. 1 is a schematic of a vehicle seat assembly with a seatback in a first position and a seat bottom in a first position according to the present disclosure.
FIG. 2 is a schematic of the vehicle seat assembly of FIG. 1 with the seatback in a second position and the seat bottom in the first position.
FIG. 3 is a schematic of the vehicle seat assembly of FIGS. 1 and 2 with the seatback in the second position and the seat bottom in a second position.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-3, a seat assembly 10 is provided that may be installed in a vehicle. The seat assembly 10 includes a seatback 12 and a seat bottom 14. The seatback 12 includes a first end 16, a second end 18, a first lateral side 20, and a second lateral side (not shown). The seatback 12 extends vertically between the first end 16 and the second end 18, and laterally between the first lateral side 20 and the second lateral side. A headrest 22 may be disposed adjacent to the second end 18. The seatback 12 may be movable relative to the seat bottom 14 (e.g., via one or more adjustment assemblies).

The seat bottom 14 includes a front end 24, a rear end 26, a third lateral side 28, and a fourth lateral side (not shown). The seat bottom 14 extends longitudinally between the front end 24 and the rear end 26, and laterally between the third lateral side 28 and the fourth lateral side. The seat bottom 14 may include a seat cushion 30 and a seat base 32. The seat cushion 30 is mounted to the seat base 32. The seat base 32 is removably mounted to a vehicle floor 40. In some configurations, the seat base 32 is mounted to a pair of seat track assemblies (not shown), which may be disposed beneath the floor 40.

The seat bottom 14 includes a latch mechanism 42 (e.g., a latch, such as a spring-loaded latch, for example) disposed near the rear end 26. The latch mechanism 42 is configured to removably engage at least one striker 44 mounted on the vehicle floor 40. The seat bottom 14 may include more than one latch mechanism 42, such as when there is more than one striker included in the seat assembly 10. For example, the seat bottom 14 may include a first latch mechanism 42 disposed on the third lateral side 28 and a second latch mechanism 42 disposed on the fourth lateral side. The seat bottom 14 may further include additional strikers, such as a third and/or fourth latch mechanism disposed near the front end 24.

The seat assembly 10 includes one or more seat adjustment assemblies. For example, the seat assembly 10 may include a first seat adjustment assembly 50 (including, for example, a seat recliner mechanism and/or a forward-dump mechanism) disposed in the seatback 12. The first seat adjustment assembly 50 may also be connected to the seat bottom 14. The first seat adjustment assembly 50 may be operable in a locked state preventing relative rotation between the seatback 12 and the seat bottom 14 and an unlocked state permitting relative rotation between the seatback 12 and the seat bottom 14. The first seat adjustment assembly is configured to release and/or move the seatback 12 in Direction B (or Direction A) among a first or locked seatback position (FIG. 1), a second or forward dump seatback position (FIGS. 2-3), and a third or rearward reclined position (not shown).

Additionally or alternatively, the seat assembly 10 may include a second seat adjustment assembly 52 (including, for example, the latch mechanism 42) disposed in the seat bottom 14. The second seat adjustment assembly 52 may be operable in a locked state preventing relative rotation between the seat bottom 14 and the vehicle floor 40 and an unlocked state permitting relative rotation between the seat bottom 14 and the vehicle floor 40. The second seat adjustment assembly is configured to release and/or move the seat bottom 14 in Direction D (or Direction C) among a first or locked seat bottom position (FIGS. 1-2), and a second or forward dump seat bottom position (FIG. 3). In the second seat bottom position, the seat bottom 14 may be disengaged from the striker 44 such that the seat bottom 14 is pivoted about its front end 24.

In certain aspects, the seat base 32 may be movably attached to the seat track assemblies (see, e.g., the seat track assemblies 720 of FIGS. 16A-16B) using mechanical fasteners (e.g., bolts, screws, rivets, pins, etc.), or any other suitable fastening technique. The seat base 32 may be movable relative to the seat track assemblies in a fore-aft direction (e.g., linearly forward and backward), such as via a third seat adjustment assembly (not shown).

In certain aspects, the seat bottom 14 is movable relative to the seatback 12 in a vertical or up-down direction, such as via a fourth seat adjustment assembly (not shown). In some configurations, the seat assembly 10 includes only one of the first 50, second 52, third, and/or fourth seat adjustment assemblies. In some alternative configurations, the seat assembly 10 includes all or a portion of the first 50, second 52, third, and/or fourth seat adjustment assemblies. All or a portion of the seat adjustment assemblies may be capable of simultaneously moving the seat assembly 10 in their respective directions. In certain aspects, all or a portion of the seat adjustment assemblies move the seat assembly 10 independently or sequentially in their respective directions. Any combination of seat adjustment assemblies, as well as alternative seat adjustment assemblies may be utilized.

As described above with reference to FIGS. 1-3, a seat assembly includes at least one seat adjustment assembly (for example, the first seat adjustment assembly 50 and/or the second seat adjustment assembly 52). The seat adjustment assembly includes a cable assembly and at least one locking mechanism. The at least one seat adjustment assembly may be disposed in a seatback, a seat bottom, or both the seatback and the seat bottom of the seat assembly.

Figure 4A:
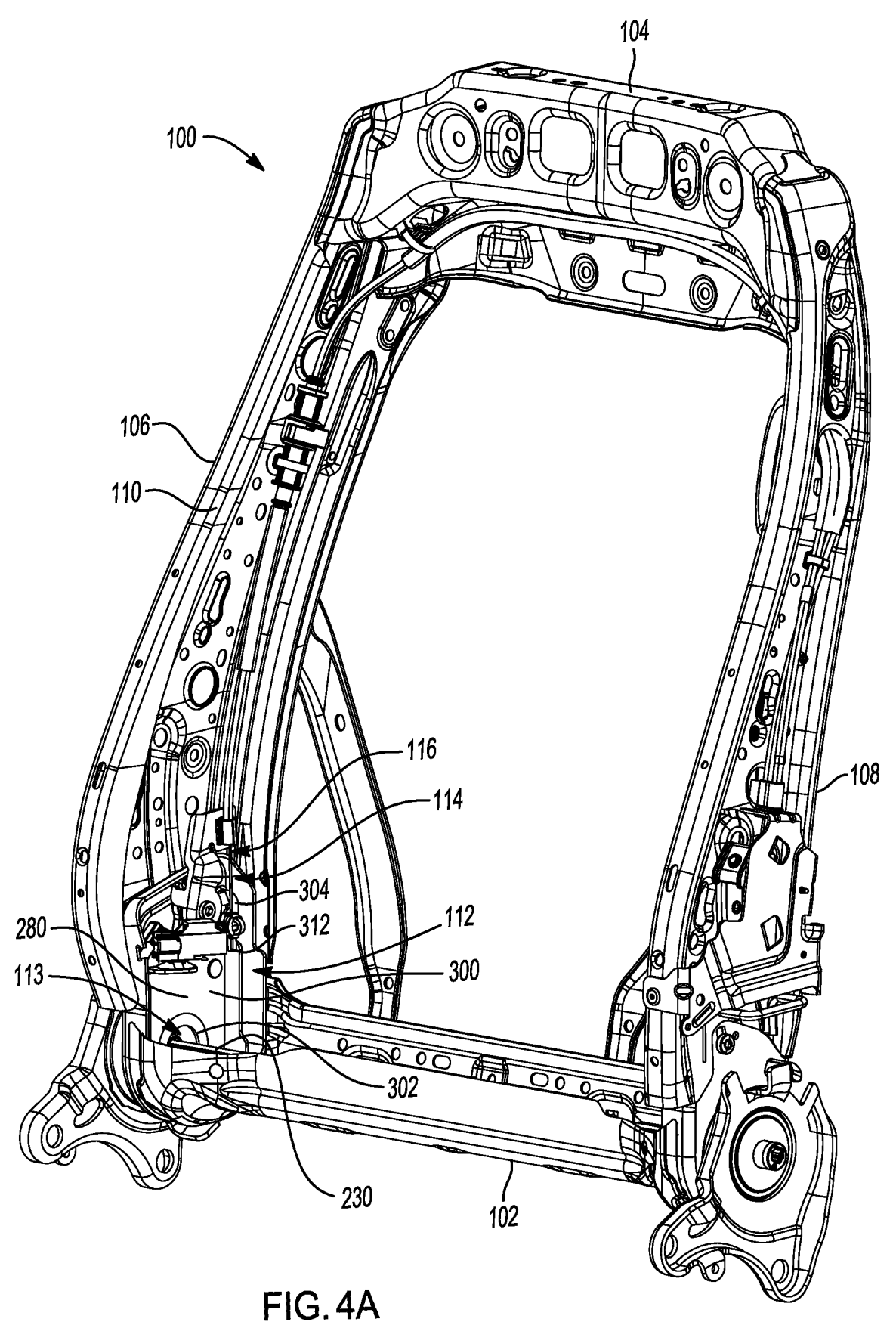
FIG. 4A is a perspective view of a seatback including a cable assembly, a recliner mechanism, and a first locking mechanism according to the present disclosure.
Figure 4B:
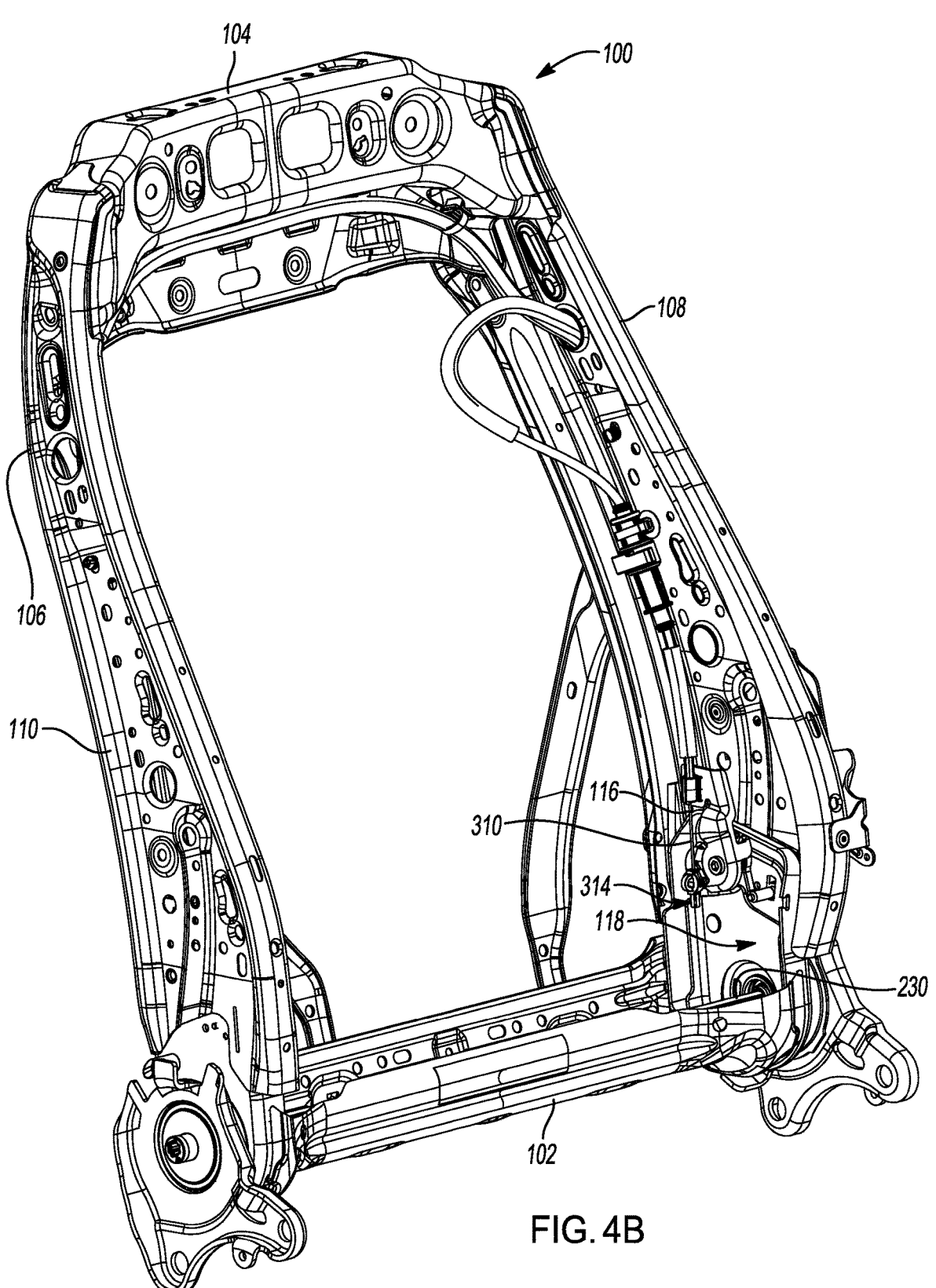
FIG. 4B is another perspective view of the seatback of FIG. 4A according to the present disclosure.

In one example, with reference to FIGS. 4A-4B, a seatback 100 of a seat assembly is shown. The seatback 100 includes a bottom end 102, a top end 104, a first lateral side 106, and a second lateral side 108 opposite the first lateral side 106. The seatback 100 includes a seatback frame 110 and a first seat adjustment assembly 112. The first seat adjustment assembly 112 may be similar to the first seat adjustment assembly 50 of FIGS. 1-3, unless otherwise described below. The first seat adjustment assembly 112 includes a recliner mechanism 113, a first locking mechanism 114 (FIG. 4A), an actuation assembly (not shown) (see, e.g., the actuation assembly 210 of FIG. 1), a cable assembly 116, and a second locking mechanism 118 (FIG. 4B). The recliner mechanism 113 may be connected to the first and/or second locking mechanisms 114, 118 via the cable assembly 116 and/or one or more links (not shown). The recliner mechanism 113 may also be attached to the seatback 100 and/or the seat bottom (not shown) of the seat assembly (i.e., the recliner mechanism 113 is connected to the seatback frame 110 that may be disposed within and covered by upholstery and/or cushioning). The recliner mechanism 113, the first locking mechanism 114, and the second locking mechanism 118 are operable in a locked state preventing relative rotation between the seatback 100 and the seat bottom (not shown) and an unlocked state permitting relative rotation between the seatback 100 and the seat bottom.

Figure 5:
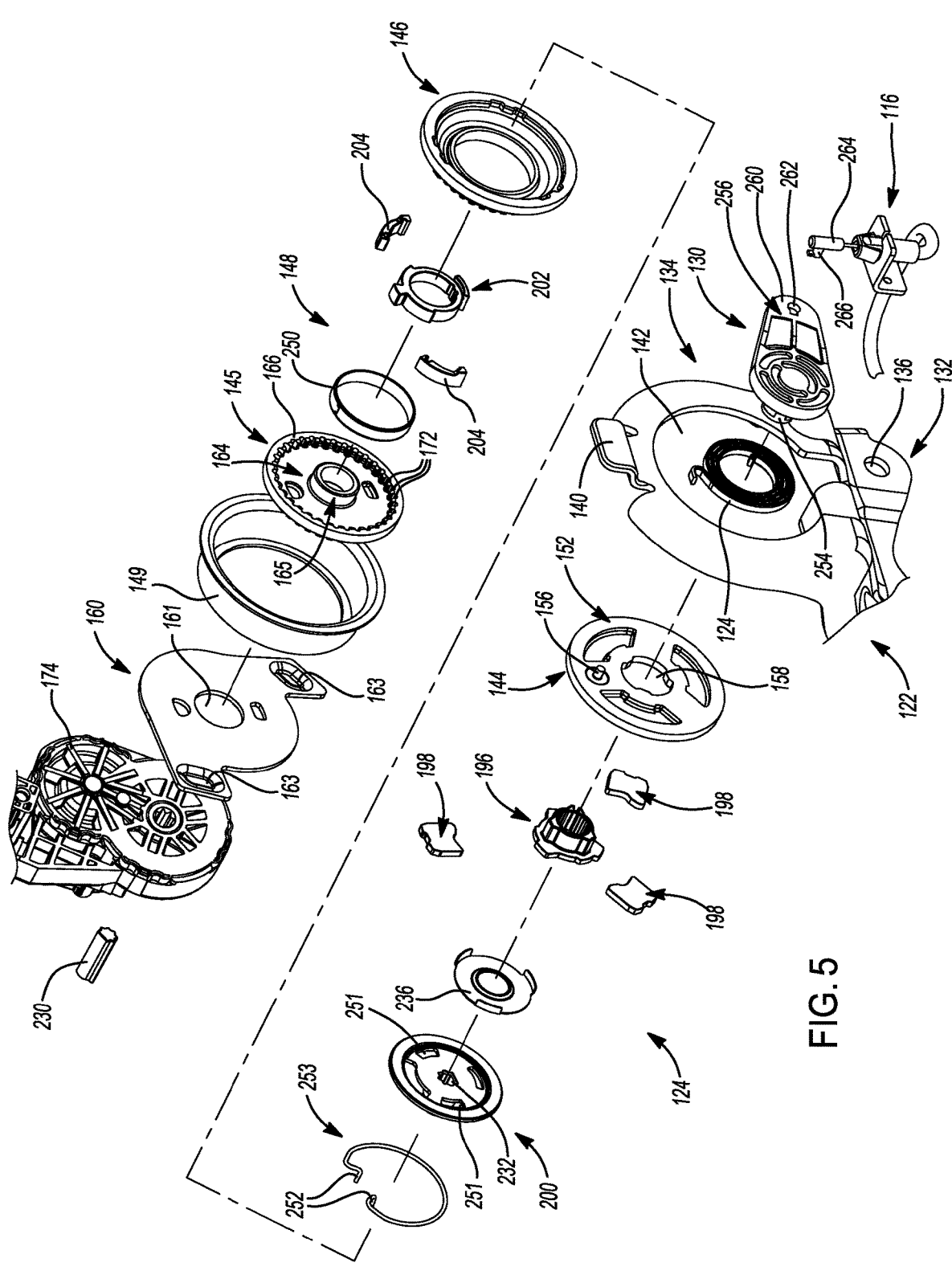
FIG. 5 is an exploded view of the recliner mechanism of FIG. 4A.
Figure 6:
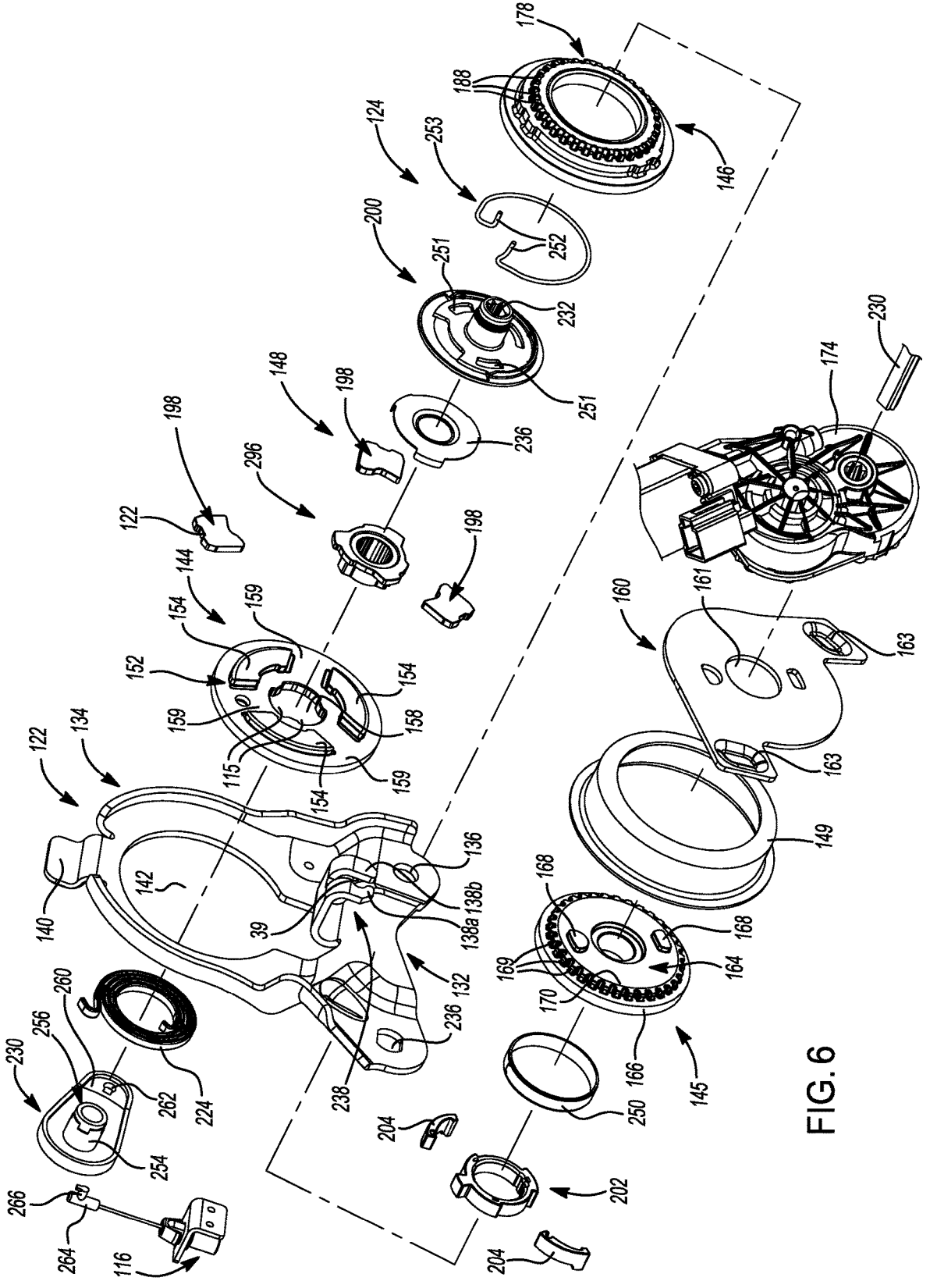
FIG. 6 is another exploded view of the recliner mechanism of FIG. 5.

With reference to FIGS. 5 and 6, the recliner mechanism 113 may include a housing plate 122, a recliner heart 124, and an unlock lever 130. The housing plate 122 may be attached to the seat bottom (for example, seat bottom 14 of FIGS. 1-3 and/or seat bottom 700 of FIGS. 16A-16B) of the seat assembly. The housing plate 122 may include a first portion 132 and a second portion 134. The first portion 132 may include a plurality of apertures 136 and a tab 138. Fasteners (not shown) may extend through the plurality of apertures 136 to securely attach the housing plate 122 to the seat bottom. The tab 138 includes a first member 138*a* and a second member 138*b* for mounting a spring (not shown) that provides a torque to return the seatback 100 from a rearward position (not shown) to the upright position (FIG. 1). The second portion 134 may include a tab 140 that is positioned above an opening 142 of the second portion 134 and extend outwardly from a periphery of the second portion 134.

The recliner heart 124 may be mounted to the housing plate 122 and may selectively permit relative rotation between the seatback 100 and the seat bottom. The recliner heart 124 may be a round recliner heart, for example, or any other suitable type of recliner heart. As shown in FIGS. 5 and 6, the recliner heart 124 may include a first locking plate 144, a second locking plate 145, a third locking plate 146, a locking assembly 148, and an encapsulating ring 149.

The first locking plate 144 may be rotationally fixed relative to the seat bottom and may be attached (e.g., laser welded) to the encapsulating ring 149. In some configurations, the first locking plate 144 may also be attached to the housing plate 122. The first locking plate 144 may be a generally circular shape and may include a main body 152 having a plurality of protrusions 154 (FIG. 5), a spring post 156 and a central aperture 158 formed therethrough. The first protrusions 154 may cooperate to form a plurality of guide recesses 159 (FIG. 6) that support at least a portion of the locking assembly 148.

An attachment plate 160 may be attached (e.g., by mechanical fasteners or laser welded) to and between the seatback frame 110 and the second locking plate 145 such that the attachment plate 160 is operatively connected with the seatback 100. In this way, the rotation of the seatback 100 causes corresponding rotation of the attachment plate 160 and the second locking plate 145. The locking assembly 148 may extend through a first opening 161 of the attachment plate 160. The attachment plate 160 may include a plurality of wings 163 that contact the first member 138a of the tab 138 when the seatback 100 is in the rearward recline position and/or the second member 138b of the tab 138 when the seatback 100 is in the forward dump position to further limit rotation of the seatback 100 in the forward dump position.

The second locking plate 145 is coupled to the attachment plate 160. The second locking plate 145 includes a plate body 164, a hub 165, and a rim 166. The plate body 164 may include projections 168 and teeth 169. The teeth 169 may extend 360 degrees around an outer diametrical surface 170 of the plate body 164. The hub 165 may extend from a center portion of the plate body 164 in a direction opposite of the projections 168. The rim 166 may extend 360 degrees around a periphery of the plate body 164 and may include teeth 172 that extend 360 degrees around an inner diametrical surface 173 of the rim 166.

The third locking plate 146 may be disposed between the first and second locking plates 144, 145. The third locking plate 146 may include an inner section 178 having teeth 188 formed thereon. At least a portion of the teeth 188 may be engaged with at least a portion of the teeth 172 of the second locking plate 145.

The locking assembly 148 may include a first cam 196, pawls 198, a pivot plate 200, a second cam 202 and wedges 204. The first cam 196 may extend through the first aperture 158 of the first locking plate 144 and may engage the unlock lever 130 such that the activation of an actuation assembly 210 (FIG. 1) rotates the unlock lever 130 and the first cam 196. The pawls 198 may be radially disposed around the aperture 158 of the first locking plate 144 with each pawl 198 slidably mounted in a corresponding guide recess 159 between a secure position and a release position. A coiled spring 224 may be attached to the spring post 156 such that the unlock lever 130 is rotationally biased toward a locked position. The coiled spring 224 may also engage the first cam 196 such that the first cam 196 is rotationally biased in a manner that forces the pawls 198 outwardly to a secured position.

A body 228 of the pivot plate 200 may connect to the second plate 145. A partition member 236 may be disposed between the body 228 of the pivot plate 200 and the first cam 196 such that rotation of the first cam 196 does not cause rotation of the pivot plate 228 and vice versa. A cross rod 230 may be received in a first aperture 232 of the pivot plate 200 such that the pivot plate 200 is drivingly engaged thereto. In this way, rotation of the cross rod 230 causes corresponding rotation of the pivot plate 200.

The second cam 202 may be disposed over and receive the hub 165 of the second locking plate 145. The second cam 202 and the pivot plate 200 may be rotationally fixed to each other.

The wedges 204 are disposed between the second cam 202 and a bushing ring 250. Each wedge 204 has a first end that extends into a second aperture 251 of the pivot plate 200. Each wedge 204 also has a groove 255 that receives a respective end 252 of a spring 253 such that the spring 253 forces the wedges 204 outwardly and away from the second cam 202. In this way, the wedges 204 are wedged between the second cam 202 and the bushing ring 250 and rotation of the pivot plate 200 and the second cam 202 causes rotation of the wedges 204.

The encapsulating ring 149 may be attached (e.g., by laser welding) to the first locking plate 144 and the housing plate 122 to hold the recliner heart 124 together and also to cover a periphery of the recliner heart 124, thereby preventing debris and fluid from infiltrating and damaging the recliner heart 124.

The unlock lever 130 may engage a portion of the cable assembly 116 and the first cam 196. Rotation of the unlock lever 130 may rotate the first cam 196 to move the pawls 198 between the secure position and the release position without corresponding rotation of the pivot plate 200 and the second cam 202. The unlock lever 130 includes a shaft portion 254 and a lever portion 256. The shaft portion 254 may extend through the first cam 196. The unlock lever 130 may be rotatable relative to the housing plate 122 about a longitudinal axis of the shaft portion 254. The lever portion 256 may extend radially outward from the shaft portion 254 and include a radially outer end 260 having an aperture 262. A first end 264 of the cable assembly 116 may include an end cap 266 that is securely received in the aperture 262 of the outer end 260 causing the cable assembly 116 and the unlock lever 130 to be engaged.

The actuation assembly 210 may be mounted on the seatback 100 and may be engaged to a portion 268 of the cable assembly 116. In this way, the actuation assembly 210 may be operably connected to the unlock lever 130 and include an actuation lever 270 and a spring 272. The actuation lever 270 may be movable between a lock state and an unlock state which causes corresponding rotation of the unlock lever 130 and the first cam 196. The spring 272 may bias the actuation lever 270 toward the lock state.

With reference to FIGS. 1-6, operation of the first seat adjustment assemblies 50 and 112 will be described in detail. When a passenger (not shown) ingress into or egress out of a space (e.g., a rear seating row) behind the vehicle seat assembly 10 (FIG. 1), the passenger may facilitate entry into or departure out of the space by the actuation assembly 210 (e.g., the activation lever 270 and/or an actuator device 273). The actuator device 273 may include, for example, a recliner handle or a switch.

Movement of the actuation assembly 210 (e.g., the activation lever 270 and/or the actuation device 273), causes rotation of the unlock lever 130 (FIGS. 5 and 6) connected thereto via the cable assembly 116 (FIGS. 4-6). Rotation of the unlock lever 130 rotates the first cam 196 in a way that causes the pawls 198 to slide to the release position without causing the corresponding rotation of the pivot plate 200 and the second cam 202. The seatback 100 may then be rotated in Direction B (FIG. 1), which causes the rotation of the second and third locking plates 145, 146, the pivot plate 200 and the second cam 202 relative to the first locking plate 144 and the first cam 196. When the pawls 198 are in the secure position, actuation of the actuator 273 causes a motor 274 to drive the cross bar 230. This causes the pivot plate 200, the second cam 202 and the wedges 204 to rotate without corresponding rotation of the first cam 196 and the first and third locking plates 144, 146. In this way, a portion of the teeth 172 of the second locking plate are meshingly engaged with a portion of the teeth 188 of the third locking plate 146.

With renewed reference to FIGS. 4A and 4B, the first locking mechanism 114 is disposed adjacent to the first lateral side 106 near the bottom end 102 of the seatback 100 and the second locking mechanism 118 is disposed adjacent to the second lateral side 108 near the bottom end 102 of the seatback 100. The first and second locking mechanisms 114, 118 and the cable assembly 116 in the seat adjustment mechanism 112 cooperate with the recliner mechanism 113 and the actuation assembly 210 to move the seatback 100 from a first position (e.g., the first position of FIG. 1) to a second position (e.g., the second position of FIGS. 2-3). The first and second locking mechanisms 114, 118 may be unlocked or disengaged by an operator (e.g., by releasing and/or engaging the actuation assembly 210 and/or actuator device 273).

Figures 7, 8:
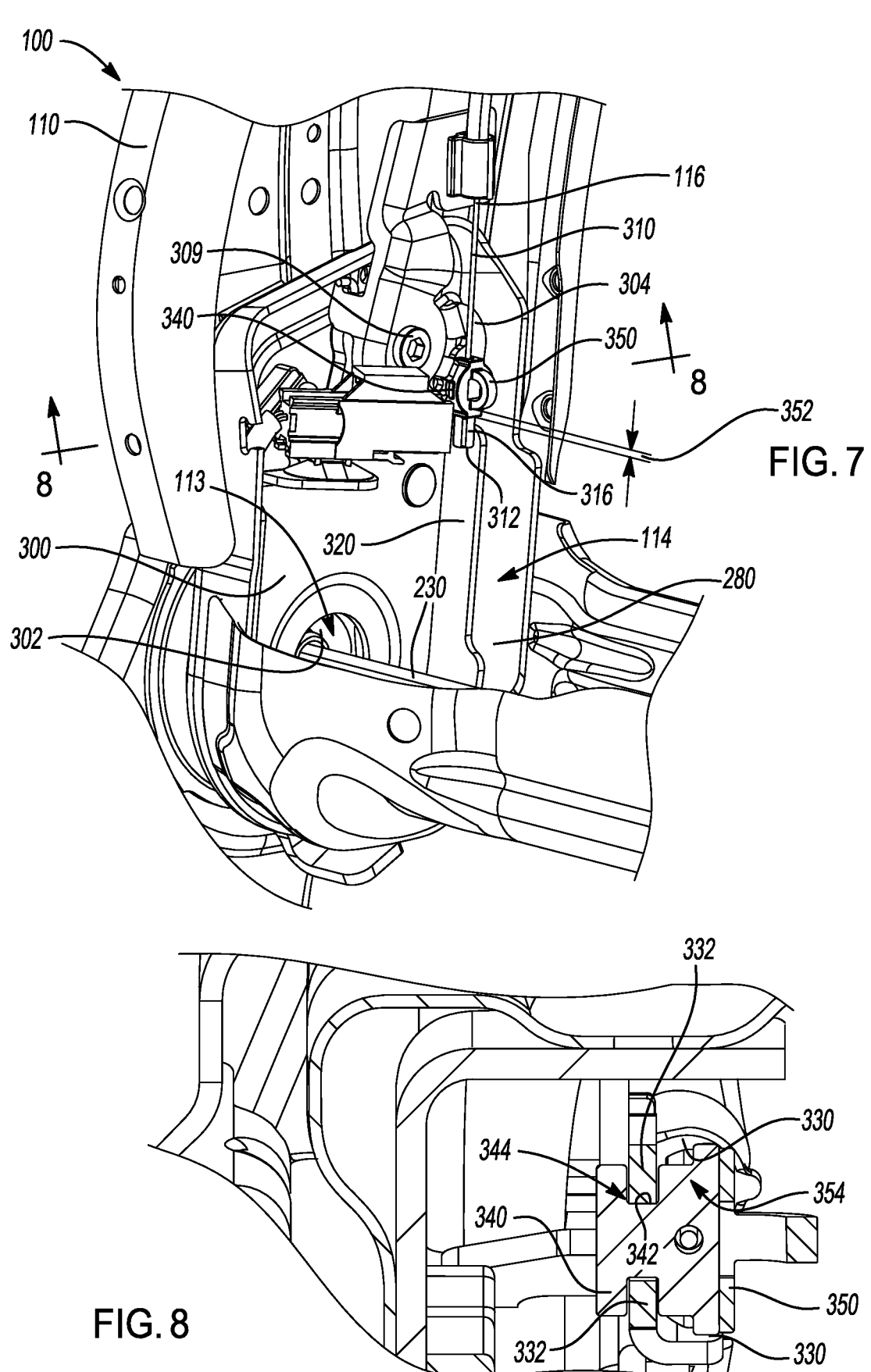
FIG. 7 is a perspective view of a portion of the seatback of FIG. 4A including a first clip and a second clip.
FIG. 8 is a cross-sectional view of the portion of the seatback of FIG. 7.

As previously discussed, the second locking mechanism 118 (FIG. 4B) is positioned adjacent to the second side 108 opposite the first locking mechanism 114 and is the same as the first locking mechanism 114 unless otherwise described below. With reference to FIG. 7, the first locking mechanism 114 includes a plate 280 including a main body 300 defining a central aperture 302. The recliner mechanism 113 may be disposed in the central aperture and at least partially connected to the plate 280 (e.g., via a portion of a cable 310 and/or a series of links (not shown)). The first locking mechanism 114 may be fixed to the seatback frame 110 using mechanical fasteners (e.g., bolts, screws, rivets, pins, etc.), or any other suitable fastening technique. The plate 280 is formed from any suitable material, such as a polymer, metal, or composite material. The plate 280 may be formed in a unitary piece or may include multiple pieces and/or components that are joined together (e.g., by suitable fastening, welding, or molding techniques).

The first locking mechanism 114 includes at least one locking feature 304, such as a lever or arm. The locking feature 304 may be configured to receive and position at least a portion of the cable assembly 116 therein. The locking feature 304 removably engages a portion of the cable assembly 116 to lock and unlock the first locking mechanism 114 enabling the operation of the recliner mechanism 113 and rotation of the seatback 100 from its upright position to a second, forward dump position. The locking feature 304 may define an aperture (not shown) and a fastener 309 extending therethrough that rotatably fastens the locking feature 304 to the body 300 of the first locking mechanism 114. The locking feature 304 may pivot about the fastener 309, such as to lock and/or unlock the first locking mechanism 114. In certain configurations, the locking feature includes a plurality of levers or arms that are connected (e.g., via mechanical fasteners) to secure and release the locking mechanism 114.

The cable assembly 116 includes the cable 310 extending between a first end 312 (FIGS. 4A and 7) and a second end 314 (FIG. 4B). Each of the ends 312, 314 may include an end cap 316. The cable assembly 116 is fixed to the seatback frame 110 via mechanical fasteners (e.g., cable clips, cable ties, etc.), or any other suitable fastening technique.

The plate 280 includes an inner channel 320 defining a first opening. The inner channel 320 is configured to receive the first end 312 of the cable 310. The first end 312 of the cable 310 is removably engaged with the first locking mechanism 114 and the second end 312 of the cable 310 is removably engaged with the second locking mechanism 318 (FIG. 4B). For example, the end cap 316 of the first end 312 is disposed in the opening of the inner channel 320 of the first locking mechanism when the cable assembly 116 is installed into the seatback 100. When disposed in the inner channel 320, the end cap 316 interferes with or engages the first locking mechanism 114 to retain the first end 312 of the cable 310.

As best shown in FIGS. 7-8, the locking feature 304 of the first locking mechanism 114 includes a recess 330 defining a second opening and a plurality of engagement features 332 positioned adjacent to the perimeter of the second opening. The recess 330 and engagement features 332 are configured to receive and removably engage a first clip 340 of the cable assembly 116. For example, the engagement features 332 may be disposed in a groove 342 of a distal portion 344 of the first clip 340 to retain the first clip 340 in the installed position. It will be appreciated that the recess 330 and the engagement features 332 could be configured such that the recess 330 and/or the engagement features 332 interfere with or engage any other suitable feature or portion of the first clip 340.

The cable assembly 116 includes a second clip 350 removably engaged to the first clip 340. The second clip 350 has a first dimension 352 (FIG. 7). As shown in FIG. 8, the second clip 350 interferes with or engages an attachment portion 354 of the first clip 340. When installed in the seat assembly, at least a portion of the second clip 350 may be disposed in the recess 330 of the first locking mechanism 114, however, the second clip 350 does not interfere with any engagement feature 332 of the first locking mechanism 314. As such, it is possible to remove the second clip 350 from the first clip 340 after installing the cable assembly 116 into the seatback 100.

Figures 9, 10:
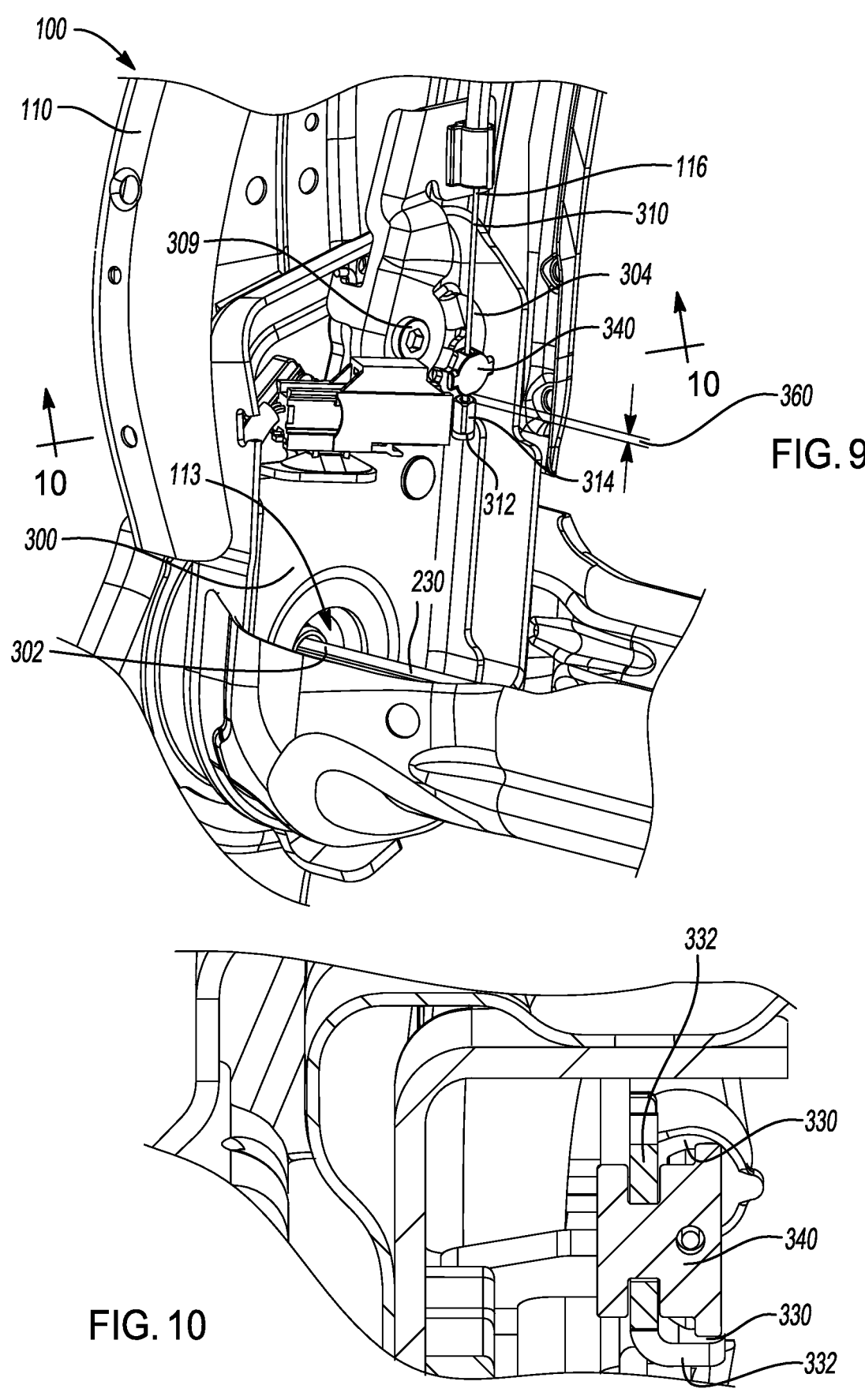
FIG. 9 is a perspective view of the portion of the seatback of FIG. 7 after the second clip is removed.
FIG. 10 is a cross-sectional view of the portion of the seatback of FIG. 9.

FIGS. 9-10 show the seatback 100 including the first locking mechanism 114 and the portion of the cable assembly 116 after the second clip 350 is removed from the first clip 340. The first clip 340 is retained by the engagement features 332 of the locking feature 304. A first dimension 360 of the cable 310, or length between the end cap 316 and the first clip 340, corresponds to the first dimension 352 of the second clip 350.

Figure 11:
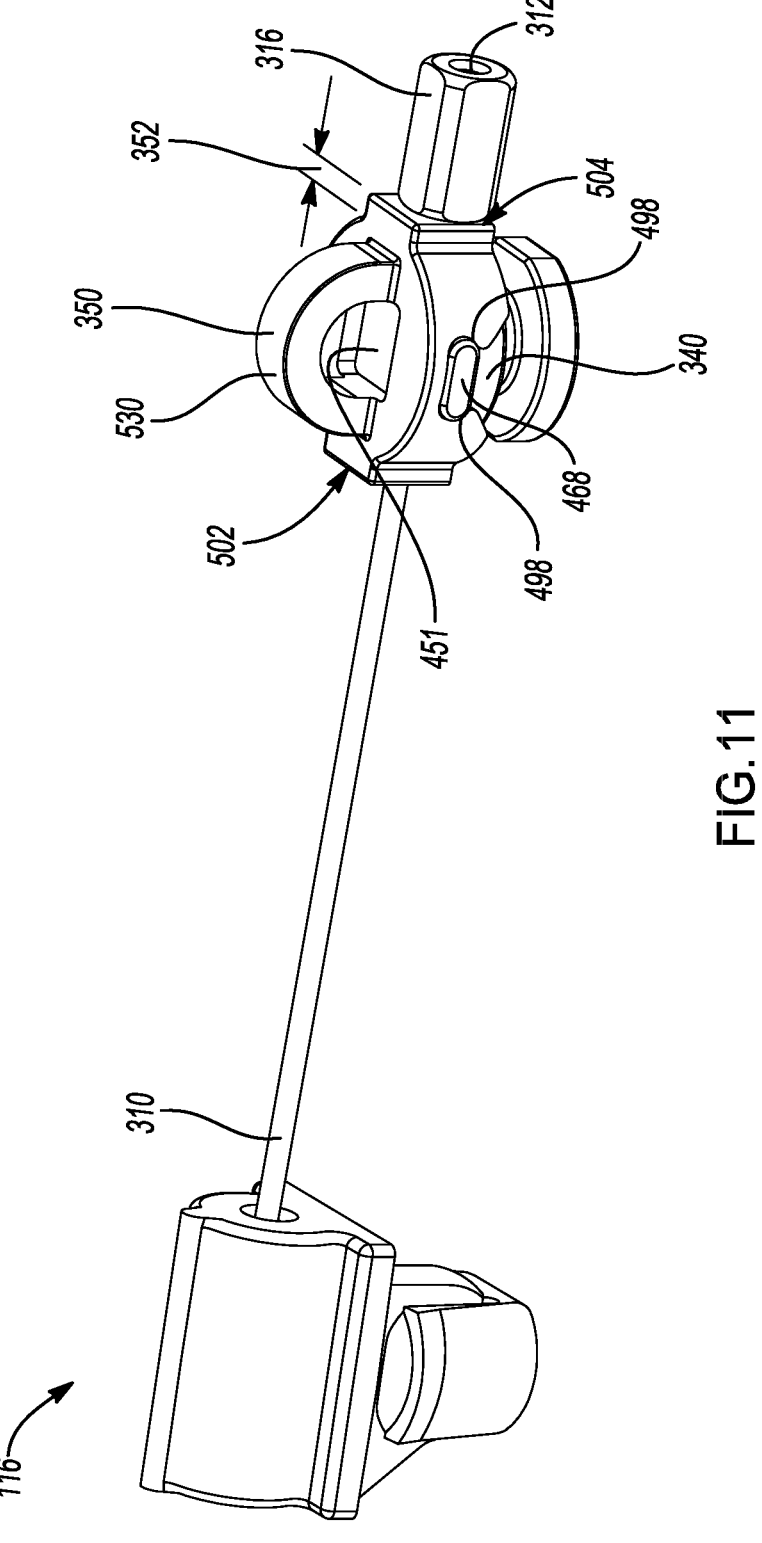
FIG. 11 is a perspective view of a portion of the cable assembly of FIG. 4A including a cable, a first clip and a second clip according to the present disclosure.
Figure 12:
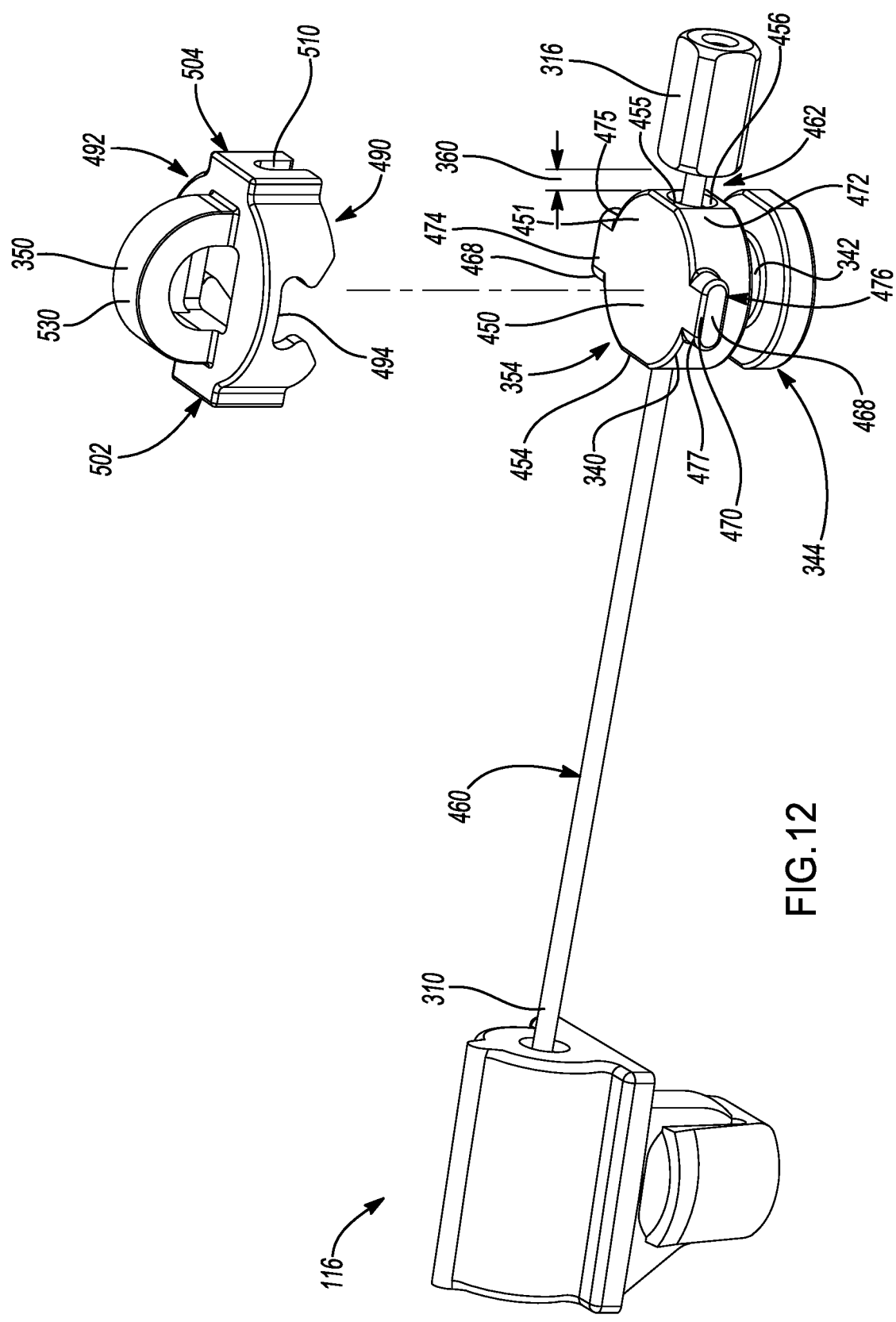
FIG. 12 is an exploded view of the cable assembly of FIG. 11.

With reference to FIGS. 11-12, a portion of the cable assembly 116 is provided. The cable assembly 116 is configured to be installed into the seatback 100. The cable assembly 116 is configured to cooperate with at least one locking mechanism (e.g., the first locking mechanism 114 and/or the second locking mechanism 118), the reclining mechanism 113, and/or the actuation assembly 210 to allow the seatback 110 to move between the first and second positions described above.

The cable assembly 116 includes the cable 310 extending between the first end 312 and a second end (not shown). The cable 310 may be a vehicle seat release cable. The first end 312 and the second end may include the engagement feature or end cap 316. The end cap 316 may be formed of a polymer, metal, or composite material. The end cap 316 may be integrally formed with the cable 310, or it may be disposed on the cable 310 during assembly (e.g., by molding). The end cap 316 has a diameter or width that is greater than the diameter or width of the cable 310.

As described above, the end cap 316 is configured to be removably engaged with a portion of the first and/or second locking mechanisms 114, 118 (FIGS. 4A-4B and 7-10). When the end cap 316 is installed in the seatback 100, the end cap 316 interferes with or engages with the portion of the first and/or second locking mechanisms 114, 118 to retain the cable assembly 116 in the seatback 100. Additionally or alternatively, the end cap 316 may connect to a portion of the reclining mechanism 113.

The cable assembly 116 includes the first clip 340 and the second clip 350. As best shown in FIG. 12, the second clip 350 is configured to be removably engaged with the first clip 340. For example, prior to and during the installation of the cable assembly 116 into the seat assembly, the second clip 340 is engaged with and installed on the first clip 350. After installation, the second clip 340 is configured to be removed from the seat assembly. In other words, after installing and/or engaging the end cap 316 and the first clip 340 with the respective engagement features 332 of the locking feature 304, the second clip 350 is removed from the first clip 340 (e.g., by operator or machine).

The first clip 340 includes a body 450 (FIG. 12) including a first surface 451, the distal portion 344 and the attachment portion 354. In the configuration shown in the figures, the body 450 may be generally circular in shape while having a first side 454 and a second side 455 opposite the first side 454 that are flat. The body 450 defines an aperture 456 extending through the attachment portion 354. The first clip 340 may be formed of a polymer material (e.g., by molding).

The cable 310 extends through the aperture 456 such that the first clip 340 is slidingly engaged to the cable 310. A first portion 460 of the cable 310 is disposed adjacent to the first side 454 of the first clip 340. A second portion 462 of the cable 310 is disposed adjacent to the second side 455 of the first clip 340. A third portion (not shown) of the cable 310 is disposed within the aperture 456 of the first clip 340 between the first portion 460 and the second portion 462 of the cable 310. The second portion 462 of the cable 310 includes the first dimension 360 of the cable 310 between the second side 455 of the first clip 340 and the end cap 432. Because the first clip 340 is slidingly engaged on the cable, the first dimension 360 of the cable 310 may change (e.g., increase or decrease in length) when the first clip 340 and the end cap 316 are not installed or retained in the seat assembly.

The distal portion 344 defines the groove 342 formed around an outer surface thereon. As discussed above in the discussion accompanying FIGS. 7-10, the first clip 340 is configured to be removably engaged with the locking feature 304 of the first and/or second locking mechanisms 114, 118. The engagement features 332 of the locking mechanism 114, 118 interfere with or engage the distal portion 344 of the first clip 340 to retain the first clip 340 in the installed position. For example, engagement features 332 of the locking mechanism 114, 118 may interfere with the groove 342 of the first clip 340 to retain the first clip 340 in the first and/or second locking mechanisms 114, 118. It will be appreciated that the locking mechanisms 114, 118 could be configured to interfere with or engage any other suitable feature or portion of the first clip 340.

The attachment portion 354 includes a plurality of protrusions 468. For example, the attachment portion 354 includes a first protrusion 470 disposed on a third side 472 of the first clip 340 and a second protrusion 474 opposite the first protrusion 470 disposed on a fourth side 475 of the first clip 340. In the configuration shown in the figures, the protrusions 468 are flush with the first surface 451, although alternative configurations are possible. The protrusions 468 include a portion of the first surface 451, a second or bottom surface 476, and a pair of rounded edges 477.

With reference to FIGS. 13A-13E, the second clip 350 is shown. The second clip 350 may be formed of a polymer material (e.g., by molding). The second clip 350 includes a body 478 that includes a first or top wall 480. In the configuration shown in the figures, the first wall 480 may be generally circular in shape. The first wall 480 defines an opening 484. The opening 484 may be generally rectangular (e.g., square), in shape, although other configurations are possible. The second clip 350 includes sidewalls 486 that extend generally perpendicularly from the first wall 480 in a first direction. The top wall 480 may be integrally formed with the sidewalls 486 and may cooperate with the side walls 486 to form a hollow, generally circular structure defining an outer surface 488 and an inner surface 489. The second clip 350 may be contoured or shaped to correspond to the contour or shape of the attachment portion 354 of the first clip 340.

The second clip 350 includes a first portion 490 and a second portion 492 that define a first pair of slots or recesses 494. Each of the first recesses 494 define a second surface 496 and includes a pair of retention features 498. The first recesses 494 are configured to receive a portion of the protrusions 468 of the first clip 340 therein.

Figure 14:
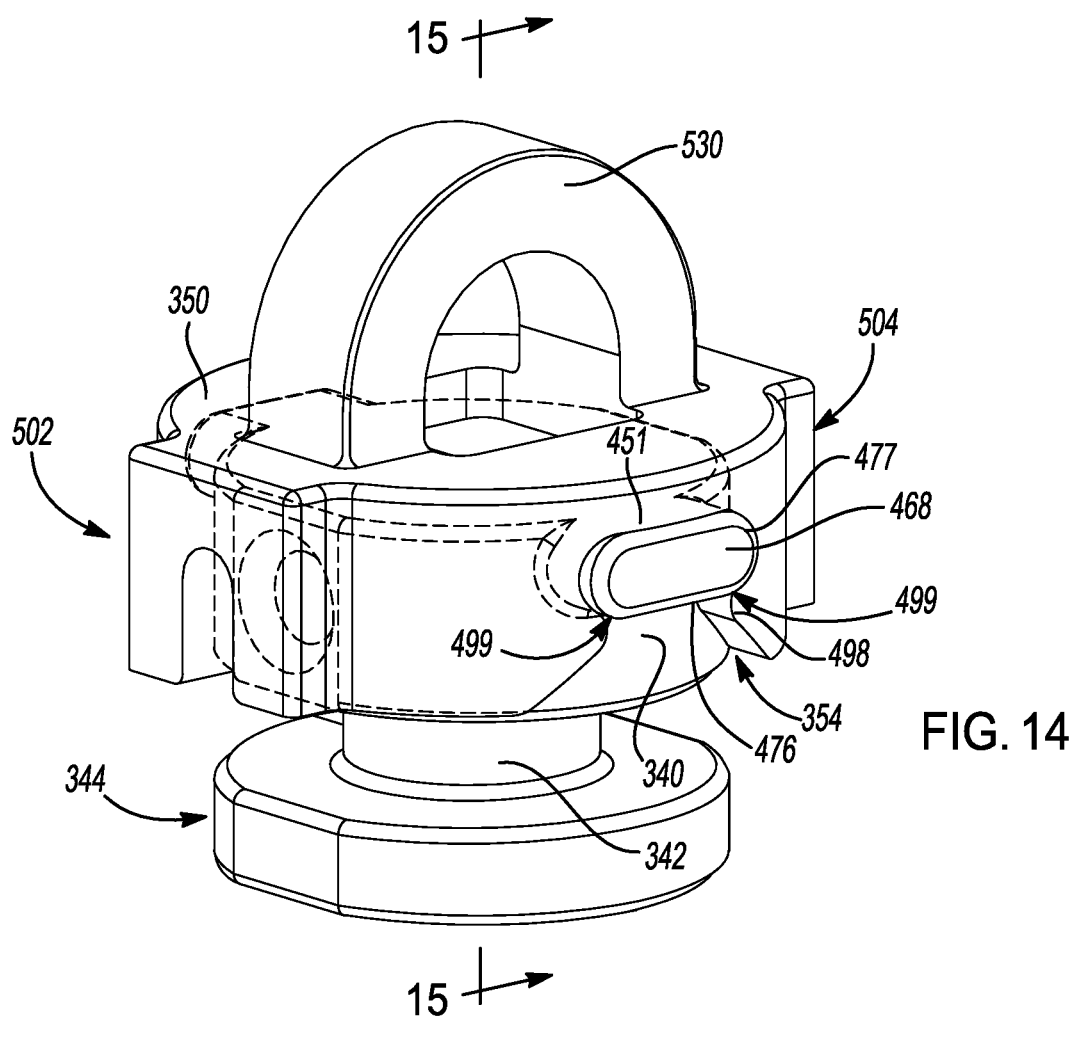
FIG. 14 is a perspective view of the first clip and the second clip of FIGS. 11-12 when the second clip is installed onto the first clip.
Figure 15:
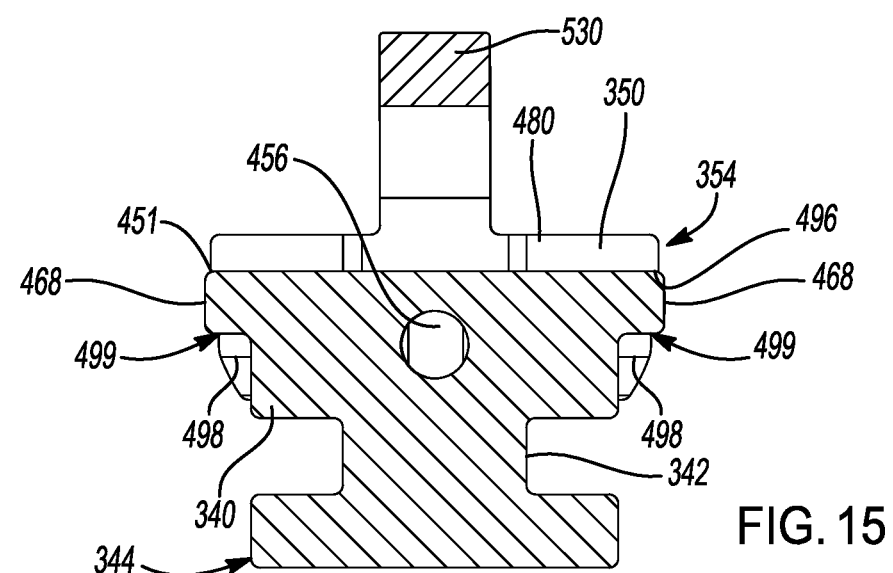
FIG. 15 is a cross-sectional view of the first clip and the second clip of FIG. 14.

As best shown in FIGS. 14 and 15, when the second clip 350 is installed on the first clip 340, the first surface 451 of the protrusions 468 of the first clip 340 contact the second surface 496 of the first recesses 494 of the second clip 350. The retention features 498 of the recesses 494 contact a top portion 499 of the protrusions 468 near the edges 477. In the installed position, the retention features 498 interfere with or engage the second surface 476 of the protrusion 468 to retain the second clip 350 in the installed position. In this manner, interference or engagement between the retention features 498 and the protrusions 468 restricts or prevents removal of the second clip 350 from the first clip 340 (as shown in FIG. 12) without sufficient force, thereby retaining the second clip 350 in an installed position.

With renewed reference to FIGS. 13A-13E, the second clip 350 includes a third portion 502 and a fourth portion 504 opposite the third portion 502. The third and fourth portions 502, 504 extend in a second direction generally longitudinally from the body 478 of the second clip 350. Each of the third and fourth portions 502, 504 define a second slot or recess 510. In the configuration shown in the figures, the second recess 510 has an elongated semi-circular shape. The second recess 510 is configured to receive a portion of the cable 310, such as when the second clip 350 is installed on and in contact with the first clip 340. For example, when the second clip 350 is installed on the first clip 340, at least some of the first portion 460 of the cable 310 is received in the second recess 510 of the third portion 502 and at least some of the second portion 462 of the cable 310 is received in the second recess 510 of the fourth portion 504.

Figure 13A:
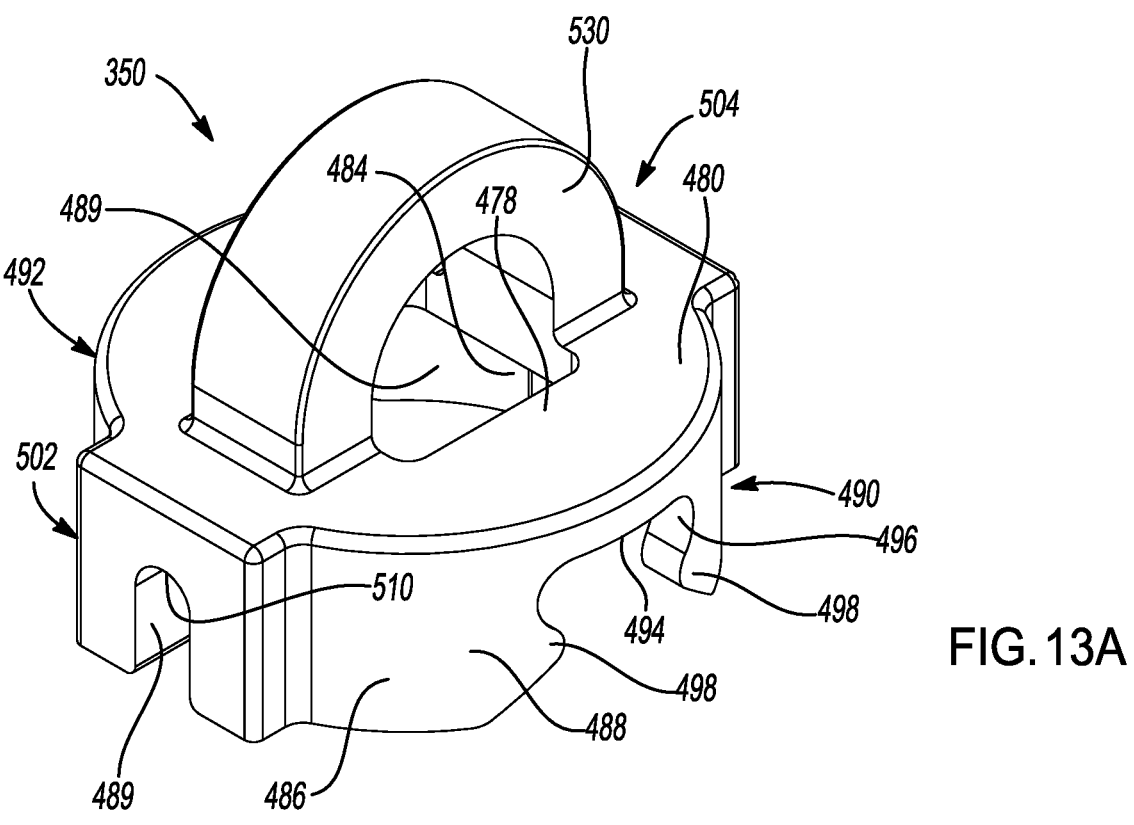
FIG. 13A is a perspective view of the second clip of the cable assembly of FIGS. 11-12.
Figure 13B:
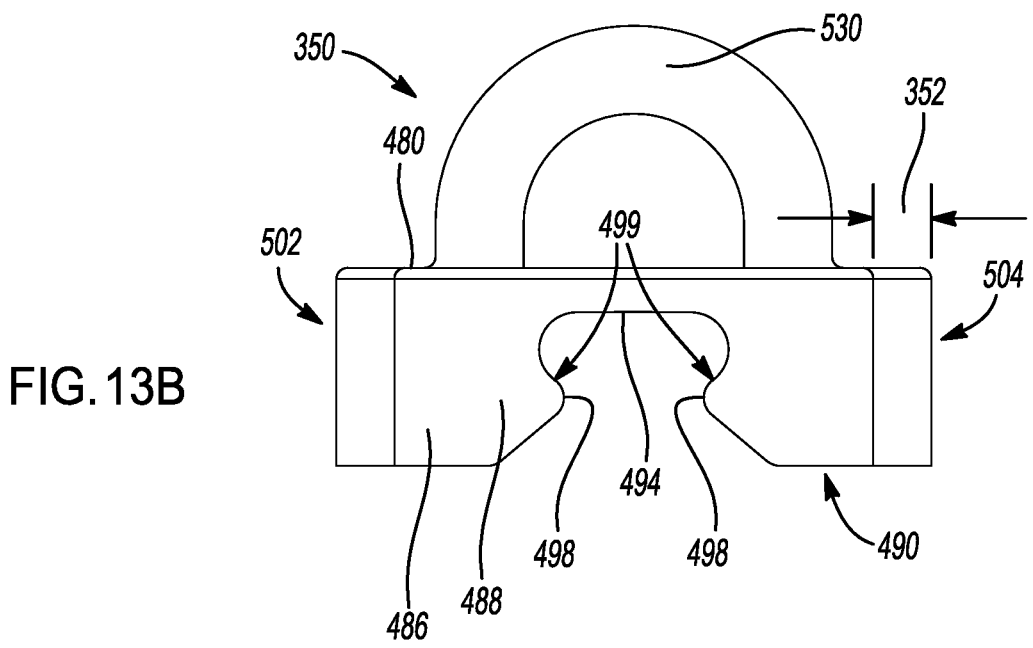
FIG. 13B is a front view of the second clip of FIG. 13A.
Figures 13C, 13D, 13E:
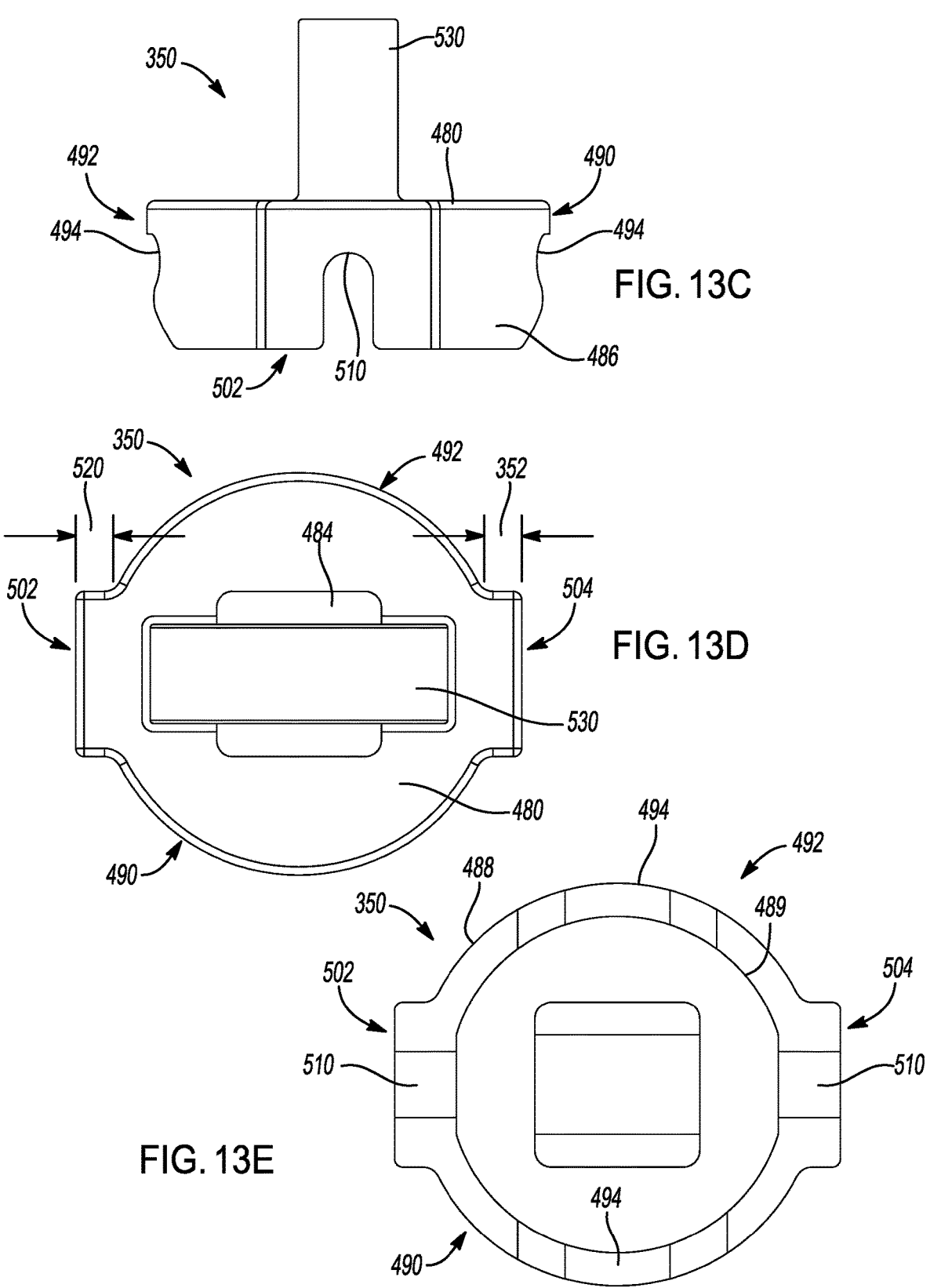
FIG. 13C is a side view of the second clip of FIG. 13A.
FIG. 13D is a top view of the second clip of FIG. 13A.
FIG. 13E is a bottom view of the second clip of FIG. 13A.

The third portion 502 of the second clip 350 has a second dimension 520 (FIG. 13D). The fourth portion 504 of the second clip 350 has the first dimension 352 (FIGS. 11, 13B, and 13D). The first dimension 352 and/or the second dimension 520 of the second clip 350 may be tailored to meet the desired configuration of the cable assembly 116. For example, the first dimension 352 of the second clip is 350 is the same as the first dimension 360 of the cable 310. This allows the cable assembly 116 to be installed into the seatback 100 with the desired orientation and configuration of the end cap 316 and the first clip 340. In other words, the first dimension 352 of the second clip 350 is tailored to meet the desired length of the of the cable 310 between the first clip 340 and the end cap 316 and maintain the length during and after the installation of the cable assembly 116 into the seatback 100.

As previously discussed, the second clip 350 is configured to be removed from the first clip 340. The second clip 350 includes a tab 530 disposed on and extending from the first wall 480. The tab 530 may be integrally formed with the first wall 480. When the tab 530 is pulled with a sufficient force (e.g., by an operator), the retention features 498 will release or disengage from the protrusions 468. Accordingly, the second clip 350 may be removed from the first clip 340. The second clip 350 may be removed after the cable 310 and the first clip 340 are installed in the seatback 100. Because both the first clip 340 and the cable 310 are engaged in their respective positions prior to the removal of the second clip 350, when the second clip 350 is removed the first clip 340 will not slide relative to the cable 310. Thus, the first dimension 360 of the cable 310 between the end cap 316 and the first clip 340 is set and maintained at the desired length.

Figure 16A:
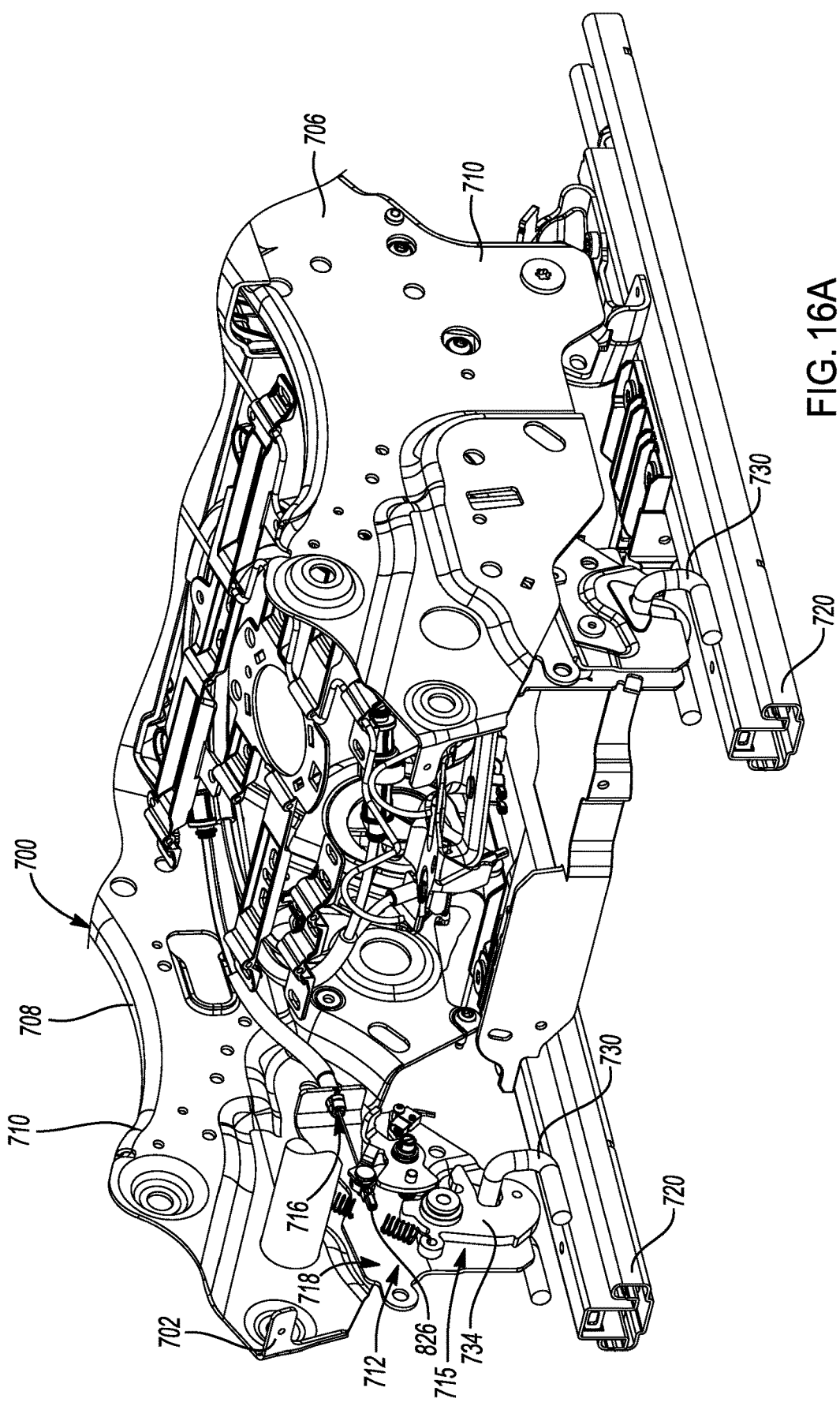
FIG. 16A is a perspective view of a portion of a seat bottom including a cable assembly, a latch mechanism, and a locking mechanism according to the present disclosure.
Figure 16B:
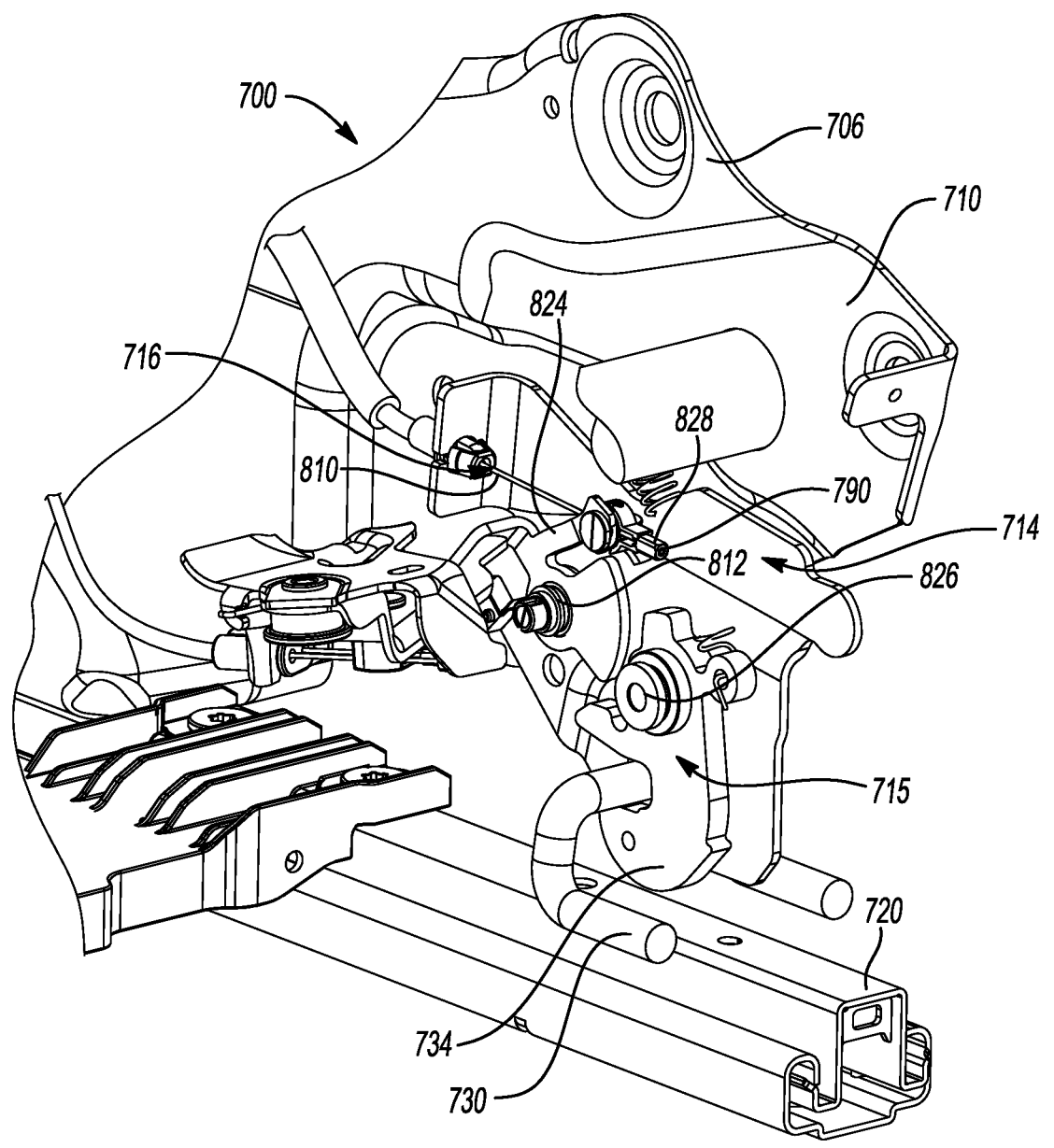
FIG. 16B is another perspective view of the portion of the seat bottom of FIG. 16A.

In another example, with reference to FIGS. 16A-16B, a portion of a seat bottom 700 of a seat assembly is shown. The structure and function of the seat bottom 700 is similar to or the same as the seat bottom 14 of FIGS. 1-3, apart from differences described below. The seat bottom 700 extends between a front end (not shown) and a rear end 702, and between a first lateral side 706 and a second lateral side 708 opposite the first lateral side 706. The seat bottom 700 includes a seatback frame 710 and a second seat adjustment assembly 712. The structure and function of the second seat adjustment assembly 712 is similar to or the same as the second seat adjustment assembly 52 of FIGS. 1-3, apart from differences described below. The second seat adjustment assembly 712 includes a first locking mechanism 714 (FIG. 16B), at least one latch mechanism 715, a cable assembly 716, and a second locking mechanism 718 (FIG. 16A).

The seat bottom 700 may be mounted to a pair of seat track assemblies 720. The seat track assemblies 720 may be disposed beneath a floor of a vehicle (not shown). The seat track assemblies 720 may be configured to move or adjust the seat in a fore-aft direction.

The seat assembly may include at least one striker 730 mounted to the vehicle floor. In some configurations, the seat assembly includes more than one striker 730, such as a first striker disposed near the first lateral side 706 and a second striker disposed near the second lateral side 708. The strikers 730 may be positioned near the rear end 702 of the seat bottom 700.

The latch mechanism 715 is connected to the seat bottom 700 (i.e., the latch mechanism 715 is connected to the frame 710 that may be disposed within and covered by upholstery and/or cushioning). The latch mechanism 715 may be operable between a latched state to allow movement of the seat bottom 700 relative to the vehicle floor.

Figure 17:
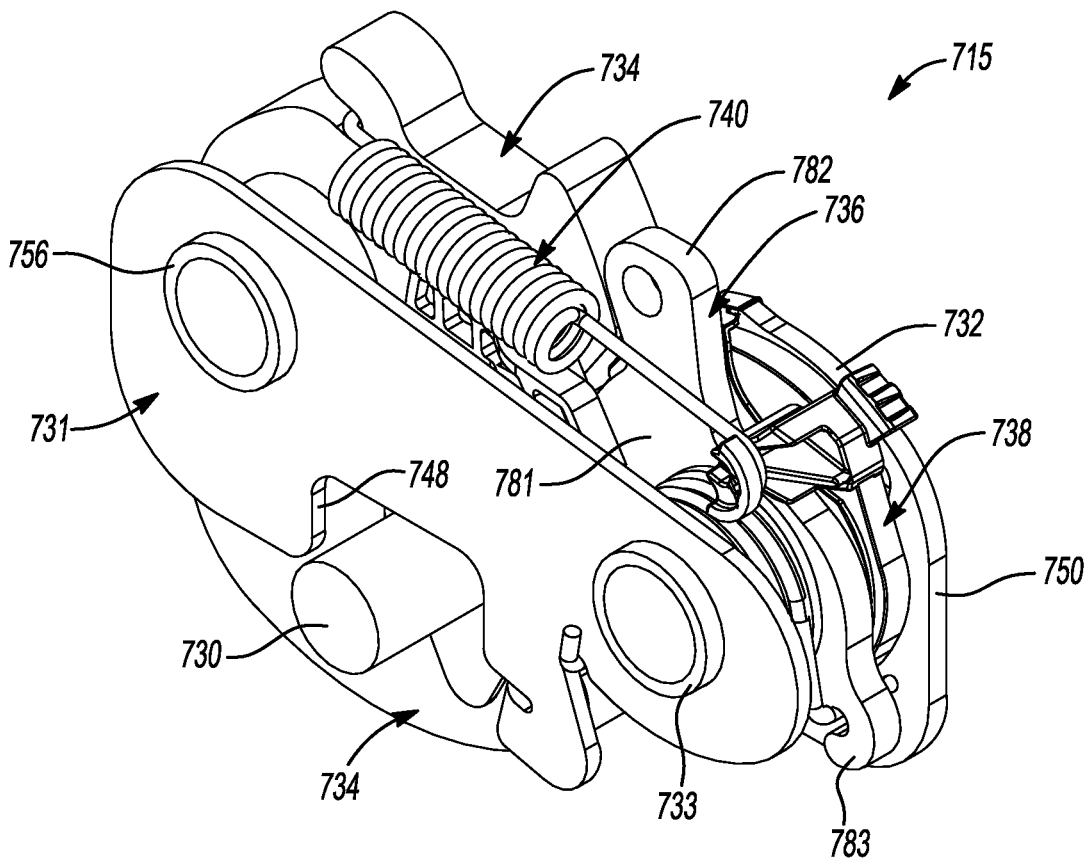
FIG. 17 is a perspective view of the latch mechanism of FIG. 16A.
Figure 18:
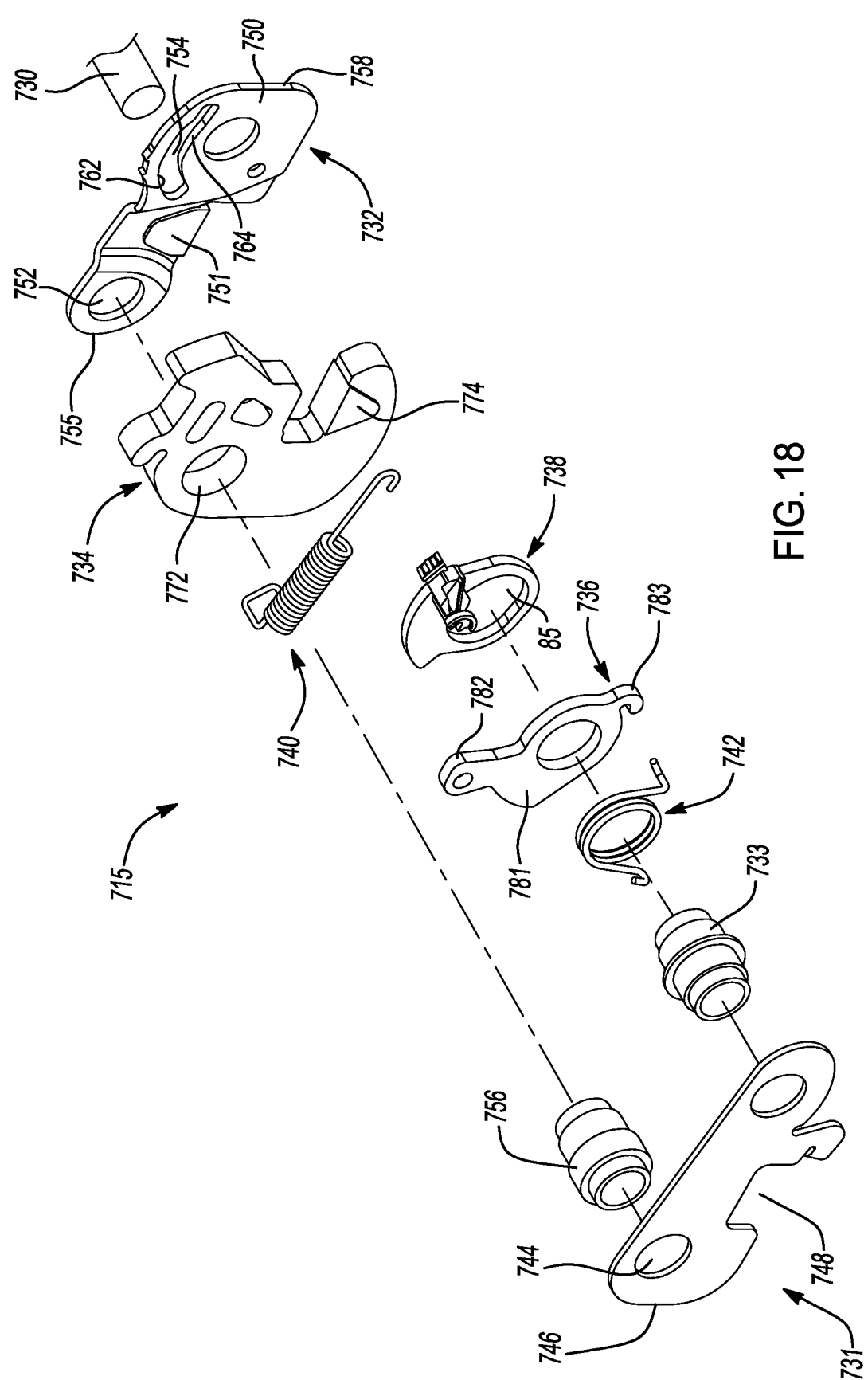
FIG. 18 is an exploded view of the latch mechanism of FIG. 17.

With reference to FIGS. 17 and 18, the latch mechanism 715 may include a first or inner plate 731, a second or outer plate 732, a latch or claw 734, first and second cams 736, 738 and first and second springs 740, 742. The first plate 731 may be fixed to the seat bottom 700 and may include a first aperture 744 at or near a first end 746. The first plate 731 also includes a rectangular-shaped cut-out 748 formed in a periphery of the first plate 731. The cut-out 748 accommodates the striker 730 when the latch assembly 715 is in the latched state.

The second plate 732 may be spaced apart from the first plate 731 to define a space therebetween. The latch 734, the first and second cams 736, 738 and the first and second springs 740, 742 may be housed or accommodated within the space. The second plate 732 may include a body 750 and a stop 751. The body 750 may include a first aperture 752 and an elongated slot 754. The first aperture 752 may be at or near a first end 755 of the second plate 732 and may be aligned with the first aperture 744 of the first plate 731. In this way, a latch fastener 756 may extend through the first apertures 744, 752 of the plates 731, 732, respectively, thereby coupling (e.g., fixing) the plates 731, 732 to each other and to the seat bottom 700. The latch fastener 756 may also be mounted to the seat bottom 700. A cam fastener 733 may further couple the first and second plates 731, 732.

The slot 754 of the second plate 732 may be arcuate and may extend from a second end 758 of the second plate 732 toward the first end 755 of the second plate 732. The slot 74 may receive a portion of the second cam 738 and may guide movement of the second cam 738. That is, the slot 754 may include a first contoured surface 762 and a second contoured surface 764 that define the path of movement of the second cam 738. Stated differently, the path that the second cam 738 moves (slides and/or rotates) may be controlled by controlling the profiles of the first and second contoured surfaces 762, 764.

As shown in FIG. 17-18, the stop 751 may be generally triangular-shaped. The stop 751 may be configured to engage the striker 730 when the latch mechanism 715 is in the latched state.

The latch 734 is rotatably coupled to and supported by the latch fastener 756 between a latched position in which the latch 734 is engaged with the striker 730 to prevent relative rotation between the seat bottom 700 and the vehicle floor, and an unlatched position (not shown) in which the latch 734 is disengaged from the striker 730 to allow relative rotation between the seat bottom 700 and the vehicle floor.

The latch 734 may include a body 770 defining an aperture 772 and a stop 774. The aperture 772 of the latch 734 may be aligned with the first apertures 744, 752 of the first and second plates 731, 732 such that the latch fastener 756 also extends through the aperture 772 of the latch 734. In this way, the latch 734 is rotatably coupled to and supported by the cam fastener 733.

The first cam 736 is rotatably coupled to the cam fastener 733 between a non-actuated state in which the latch 734 is prevented from moving (or rotating) from the latched position to the unlatched position, and in an actuated state (not shown) in which the latch 734 is allowed to move (or rotate) from the latched position to the unlatched position. When the first cam 736 is in the non-actuated state, the first cam 736 abuts against the latch 734. When the first cam 736 is in the actuated state, the first cam 736 is spaced apart from the latch 734. The first cam 736 is movable independent from the second cam 738. The first cam 736 includes a body 781, a cable tab 782, and a spring tab 783. The cam fastener 733 also extends through the first cam 736 such that the first cam 736 is rotatably coupled to and supported by the latch fastener 756. The cable tab 782 extends through a periphery of the body 781 and includes an opening 786 extending therethrough. As will be described in greater detail below, a first end 790 of a cable 810 of the cable assembly 716 may be securely received in the opening 786 of the cable tab 782, which causes the cable 810 and the first cam 736 to be engaged. When the first cam 736 is in the actuated state, the cable tab 782 abuts against the latch 734. When the first cam 736 is in actuated state, the cable tab 782 is spaced apart from the latch 734 (i.e., does not abut against the latch 734).

As shown in FIG. 2, an actuation device 820 (e.g., a lever, pull strap, and/or activation switch) may be mounted on the seat bottom 14 and engage to a portion 821 of the cable 810. The actuation device 820 may be operably connected to the first cam 736 such that movement of the actuation device 820 (e.g., when a user engages the actuation device) between a secure position and a release position causes corresponding rotation of the first cam 736 and movement of the latch 734 between the locked and unlocked positions. The actuation device 820 may include a spring (not shown) which may bias the actuation device toward the secure position. While the activation device 820 is positioned in the seat bottom 14 of FIGS. 2, it should be appreciated that the actuation device may be positioned in alternative configurations (e.g., mounted to the seatback 12 and/or beneath the seat bottom 14).

The second cam 738 may be disposed between the second plate 732 and the first cam 736 and may be coupled to and supported by the second plate 732. The second cam 738 is also allowed to move (slide and/or rotate) relative to the first and second plates 731, 732. That is, when the first cam 736 is in the non-actuated state, the second cam 738 is engaged with the latch 734 to prevent the latch 734 from rotating from the latched position to the unlatched position. When the first cam 736 is in the actuated state, the second cam 738 moves such that the second cam 738 is disengaged from (i.e., spaced apart from) the latch 734, thereby allowing the latch 734 to rotate from the latched position to the unlatched positions. A portion of the second cam 738 may be coupled to the first spring 740 allowing the second cam 738 to move along its path when engaging and disengaging the latch 734. A retainer clip 824 may be coupled to the second plate 732 and may contact the second cam 738 to restrict lateral movement of the second cam 738 relative to the second plate 732.

The first spring 740 be configured to rotationally bias the latch 734 toward the unlatched position. The second spring 742 may exert a torsional force that rotationally biases the first cam 736 toward the non-actuated state. The second spring 742 may wrap around the cam fastener 733 and engage the first plate 731.

With continued reference to FIGS. 1-3 and 16-18, operation of the second seat adjustment assembly 712 will be described in detail. The first locking mechanism 714 (FIG. 16B) is disposed adjacent to the first lateral side 706 near the rear end 702 of the seat bottom 700 and the second locking mechanism 718 (FIG. 16A) is disposed adjacent to the second lateral side 708 near the rear end 702 of the seat bottom 700. Each of the first and second locking mechanisms 714, 718 are coupled to their respective latch mechanisms 715, for example, through a series of links and/or the cable assembly 716. Accordingly, the latch mechanism is coupled to the cable assembly 716 via the first and/or second locking mechanisms 714, 718. The first and second locking mechanisms 714, 718, the latch mechanisms 715, and the cable assembly 716 cooperate to move the seat bottom 700 from a first position (e.g., the first position of FIGS. 1-2) to a second position (e.g., the second position of FIG. 3).

When a passenger (not shown) wants to ingress into or egress out of a space (e.g., a rear seating row) behind the vehicle seat assembly 10 (FIGS. 1-3), the passenger may facility entry into or departure out of the space by moving the actuation device 820 between the secure position and the release position to rotate the seat bottom in Direction D (or alternatively in direction C). Movement of the actuation device 820 from the secure position to the release position causes rotation of the first cam 736 (FIGS. 17 and 18) connected thereto (via the cable assembly 716) from the non-actuated state to the actuated state. Rotation of the first cam 736 causes the first cam 736 to engage the second cam 738, thereby moving the second cam 738 out of engagement with the latch 734. Once the second cam 738 is out of engagement with the latch 734, the latch 734 moves from the latched position to the unlatched position, thereby releasing the striker 730 and permitting the movement of the seat bottom 700 relative to the vehicle floor. In other words, when the actuation device 820 is moved by a passenger, the seat bottom 700 pivots about the front end from the first position (FIGS. 1 and 2) to the second position (FIG. 3), and vice versa.

With renewed reference to FIG. 16B, the first locking mechanism 714 is shown. As previously discussed, the second locking mechanism 718 (FIG. 16A) is positioned adjacent to the second side 708 opposite the first locking mechanism 714 and is the same as the first locking mechanism 714 unless otherwise described below. The locking mechanism 714 includes a locking feature 824. The first locking mechanism 714 may be fixed to the seat bottom frame 710 and/or the latch mechanism 715 using mechanical fasteners (e.g., bolts, screws, rivets, pins, etc.), links, or any other suitable fastening technique. Likewise, the at least one locking feature 824 may be fixed to the first locking mechanism 714 via mechanical fasteners.

The first locking feature 824 may be configured to receive and position at least a portion of the cable assembly 716 therein, thereby coupling the first locking mechanism 714 to the latch mechanism 715 via the cable assembly 716. The cable assembly 716 includes the cable 810 extending between a first end 790 (FIG. 16B) and a second end 826 (FIG. 16A). Each of the ends 790, 826 may include an end cap 828. The cable assembly 716 is fixed to the seat bottom frame 710 via mechanical fasteners (e.g., cable clips, cable ties, etc.), or any other suitable fastening technique.

Figure 19:
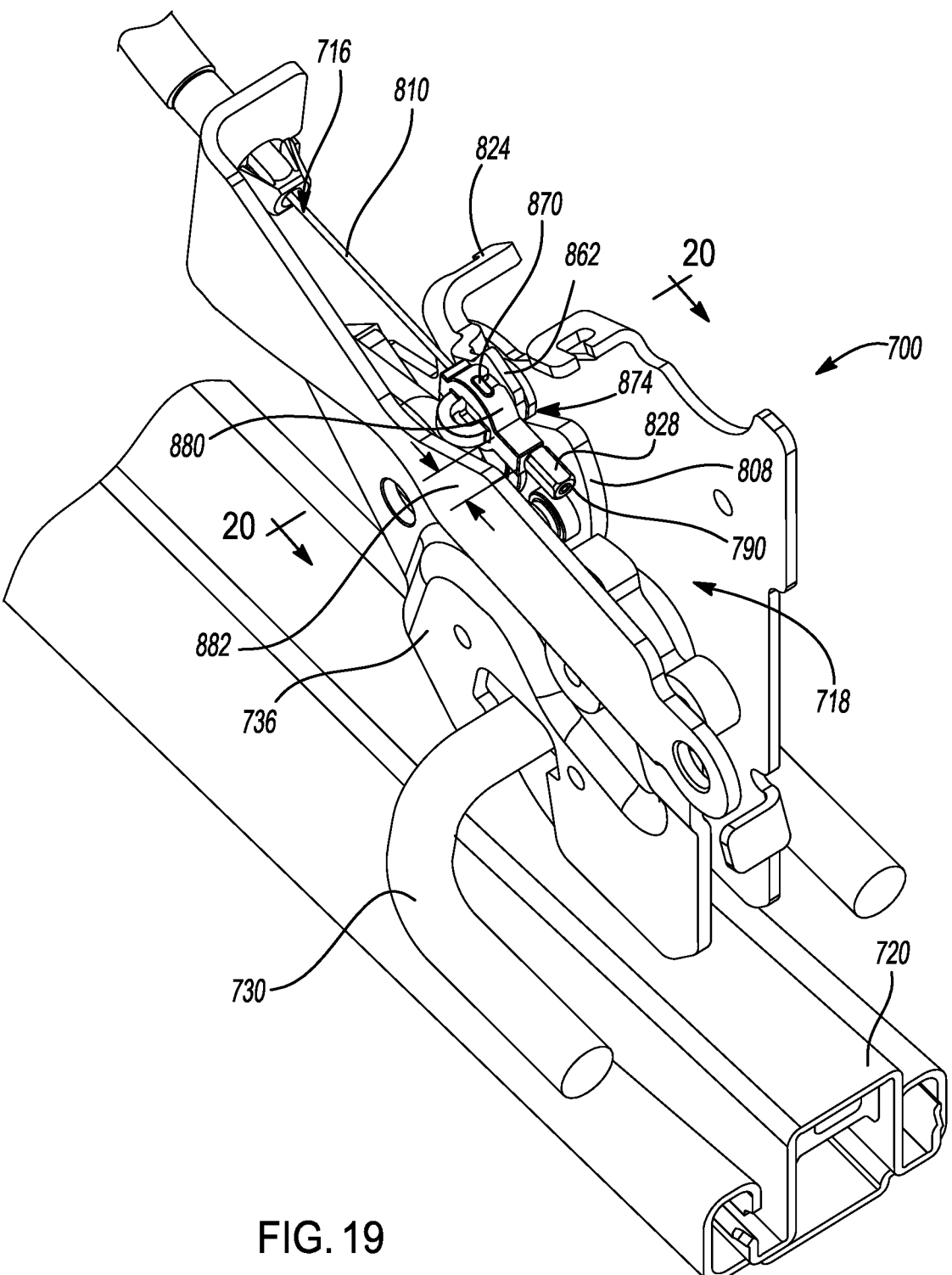
FIG. 19 is a perspective view of a portion of the seat bottom of FIG. 16A including a first clip and a second clip.
Figure 20:
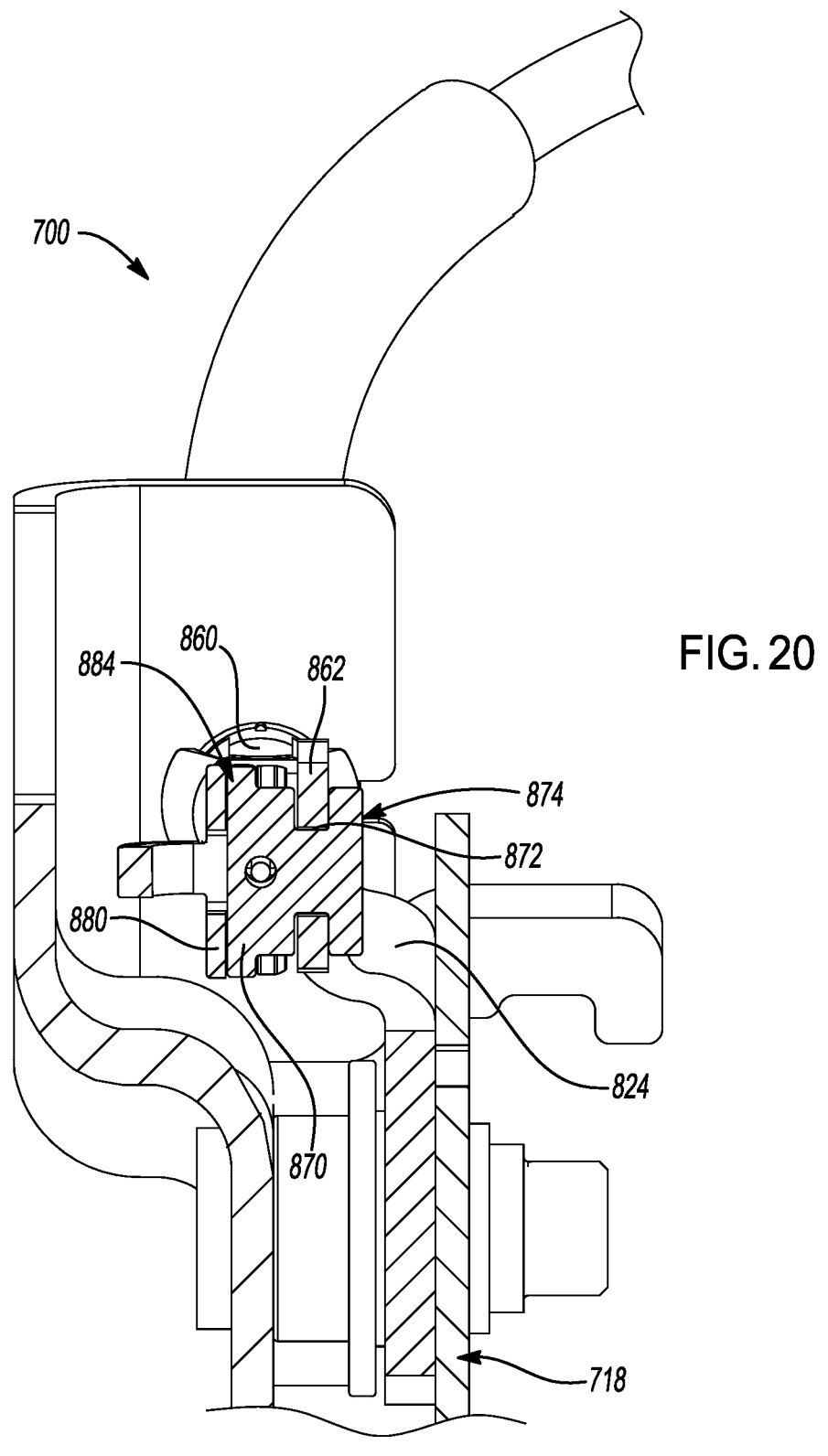
FIG. 20 is a cross-sectional view of the portion of the seat bottom of FIG. 19.

With reference to FIGS. 19-20, the second locking mechanism 718 is shown. The locking feature 824 of the second locking mechanism 718 includes a recess 860 defining an opening and a plurality of engagement features 862 positioned adjacent to the perimeter of the opening. The recess 860 and engagement features 862 are configured to receive and removably engage a first clip 870 of the cable assembly 716. For example, the engagement features 862 may contact and be disposed in a groove 872 of a distal portion 874 of the first clip 870 to retain the first clip 870 in the installed position. It will be appreciated that the recess 860 and the engagement features 862 could be configured such that the recess 860 and/or the engagement features 862 interfere with or engage any other suitable feature or portion of the first clip 870.

The cable assembly 716 includes a second clip 880 removably engaged to the first clip 870. The second clip 880 has a first dimension 882. The second clip 880 interferes with or engages an attachment portion 884 of the first clip 870. When installed in the seat assembly, at least a portion of the second clip 880 may be disposed in the recess 860 of the second locking mechanism 718, however, the second clip 880 does not interfere with any engagement feature 862 of the second locking mechanism 718. As such, it is possible to remove the second clip 880 from the first clip 870 after installing the cable assembly 716 into the seat bottom 700.

Figure 21:
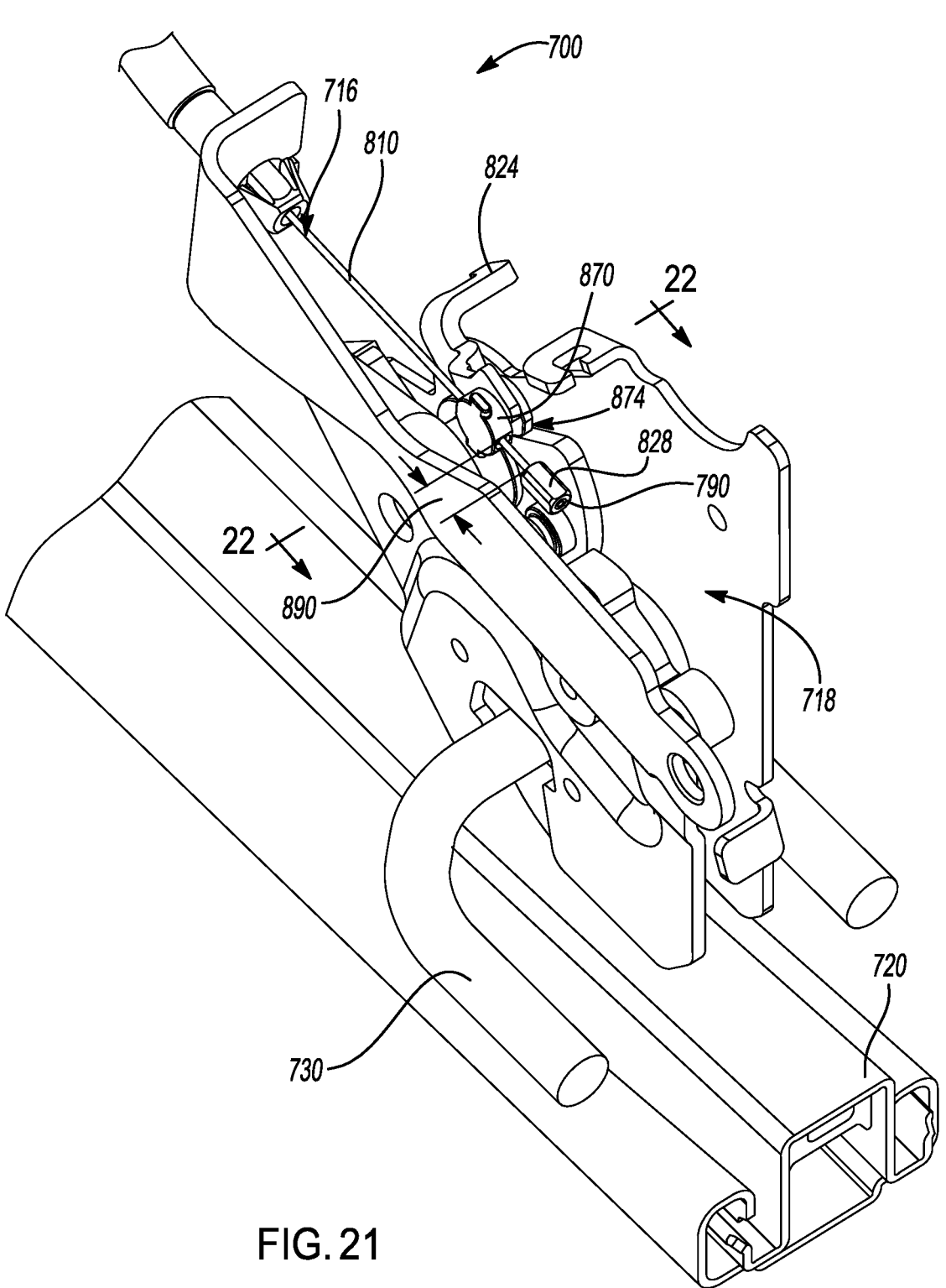
FIG. 21 is a perspective view of the portion of the seat bottom of FIG. 19 after the second clip is removed.
Figure 22:
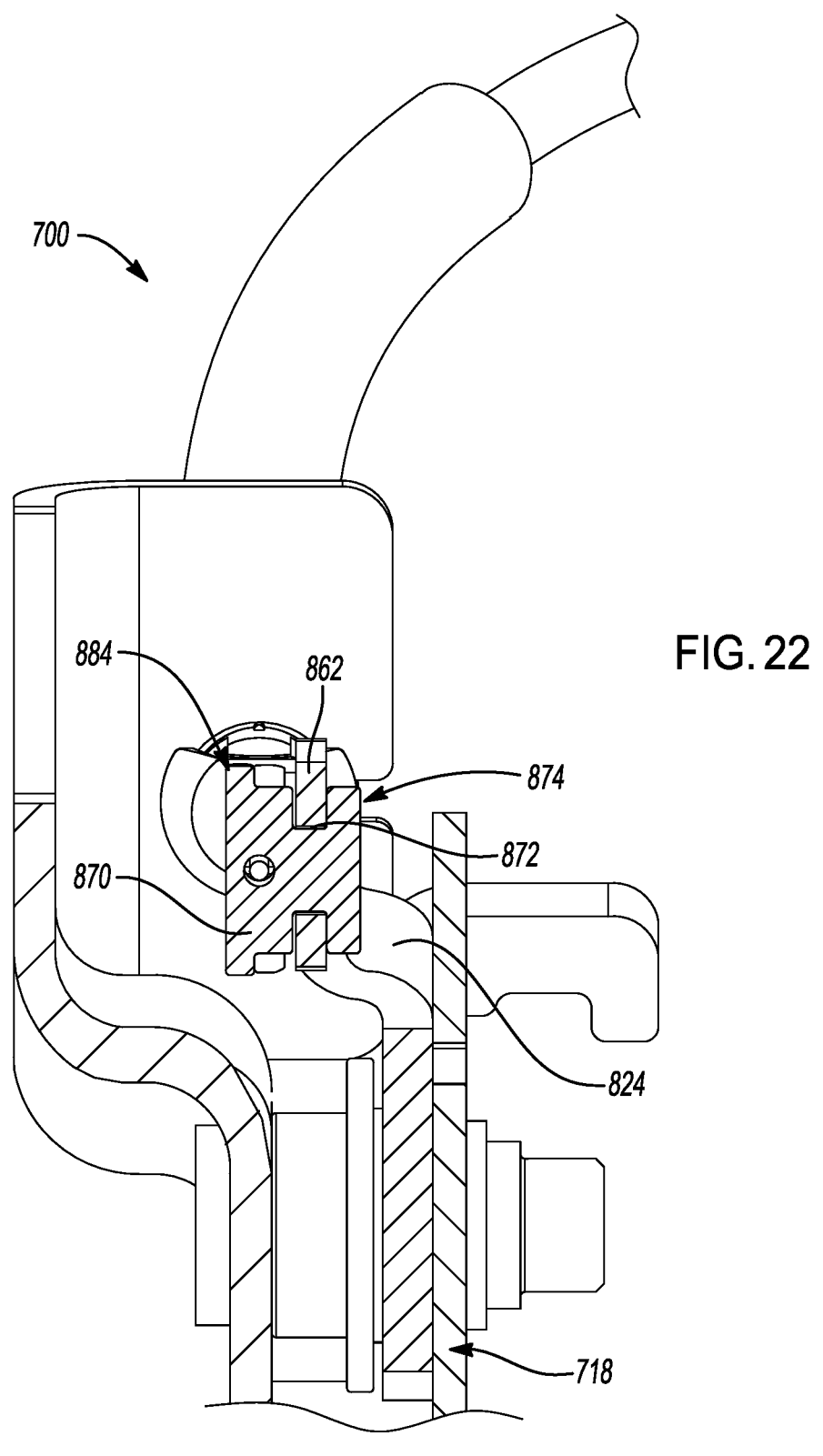
FIG. 22 is a cross-sectional view of the portion of the seat bottom of FIG. 21.

FIGS. 21-22 show the seat bottom 700 including the second locking mechanism 718 and the portion of the cable assembly 716 after the second clip 880 is removed from the first clip 870. The first clip 870 is retained by the engagement features 862 of the locking feature 824. A first dimension 890 of the cable 810, or length between the end cap 828 and the first clip 870, corresponds to the first dimension 882 of the second clip 880.

Figure 23:
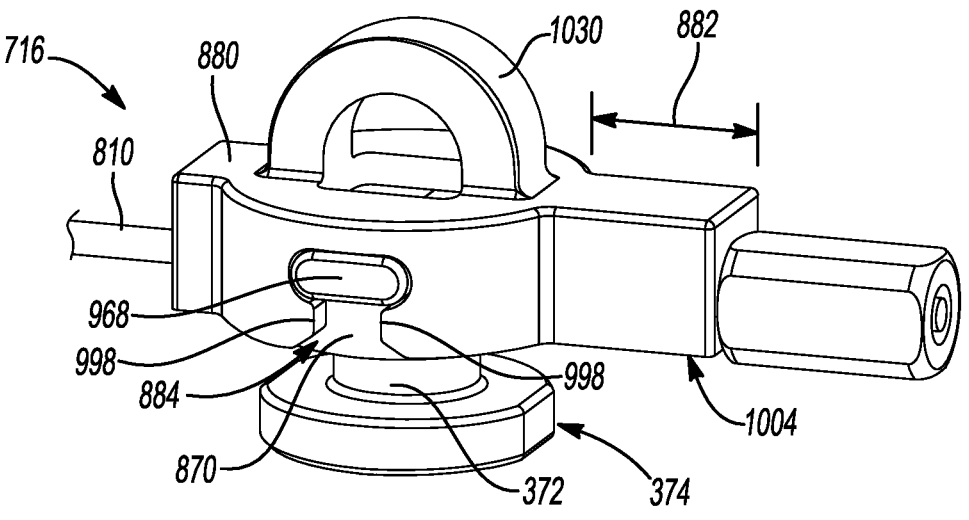
FIG. 23 is a perspective view of a portion of the cable assembly of FIG. 16A including a cable, a first clip and a second clip according to the present disclosure.
Figure 24:
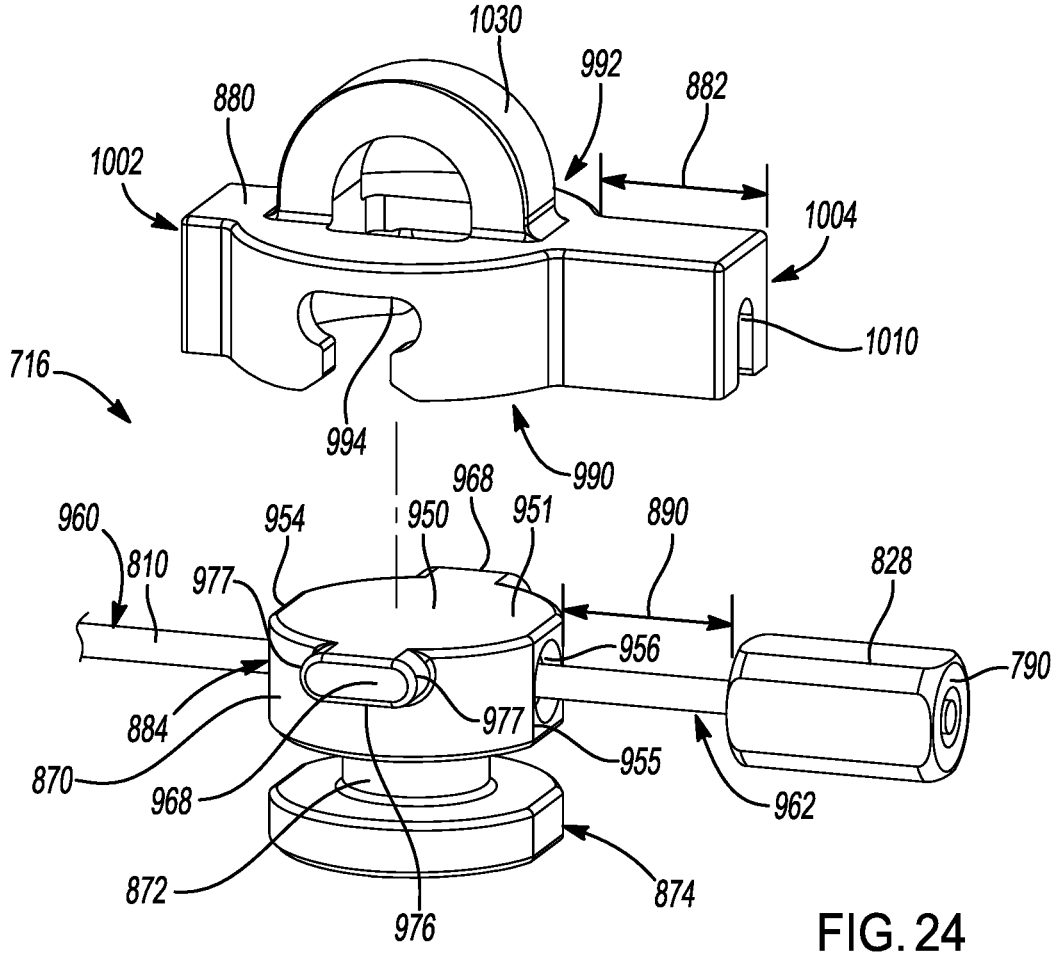
FIG. 24 is an exploded view of the cable assembly of FIG. 23.

With reference to FIGS. 23-24, a portion of the cable assembly 716 is provided. The structure and function of the cable assembly 716 is similar to or the same as the cable assembly 116 of FIGS. 11-12, apart from differences described below. As previously described, the cable assembly 716 is configured to be installed into the seat bottom 700 (FIGS. 16A-16B). The cable assembly 716 is configured to cooperate with the first and/or second locking mechanisms 714, 718 and the latch mechanism 715 of the seat bottom 700 to allow the seat bottom 700 to move between the first and second positions described above.

The cable assembly 716 includes the cable 810 extending between the first end 790 and the second end 826 (FIG.

16A). The first end 790 and the second end 826 may include the engagement feature or end cap 828.

The cable assembly 716 includes the first clip 870 and the second clip 880. As best shown in FIG. 24, the second clip 880 is configured to be removably engaged with the first clip 870.

The first clip 870 includes a body 950 (FIG. 24) including a first surface 951, the distal portion 874 and the attachment portion 884. The body 950 has a first side 954 and a second side 955 opposite the first side 954 and defines an aperture 956 extending therethrough.

The cable 810 extends through the aperture 956 such that the first clip 870 is slidingly engaged to the cable 810. A first portion 960 of the cable 810 is disposed adjacent to the first side 954 of the first clip 870. A second portion 962 of the cable 810 is disposed adjacent to the second side 955 of the first clip 870. A third portion (not shown) of the cable 810 is disposed within the aperture 956 of the first clip 870 between the first portion 960 and the second portion 962 of the cable 810. The second portion 962 of the cable 810 includes the first dimension 890 between the second side 955 of the first clip 870 and the end cap 828.

The distal portion 874 defines the groove 872 formed around an outer surface thereon. The engagement features 862 of the locking feature 824 of the first and/or second locking mechanisms 714, 718 may interfere with the groove 872 of the first clip 870 to retain the first clip 870 in the seat assembly.

The attachment portion 884 includes a plurality of protrusions 968. The protrusions 968 include a portion of the first surface 951, a second or bottom surface 976, and a pair of rounded edges 977.

With reference to FIGS. 25A-25E, the second clip 880 includes a body 978 that includes a first or top wall 980. The first wall 980 defines an opening 984. The second clip 880 includes sidewalls 986 that extend generally perpendicularly from the first wall 980 in a first direction. The first wall 980 may be integrally formed with the sidewalls 986 and may cooperate with the side walls 986 to form a hollow, generally circular structure defining an outer surface 988 and an inner surface 989.

The second clip 880 includes a first portion 990 and a second portion 992 that define a first pair of slots or recesses 994. Each of the first recesses 994 define a second surface 996 and includes a pair of retention features 998. The first recesses 994 are configured to receive a portion of the protrusions 968 of the first clip 870 therein.

With renewed reference to FIGS. 23-24, when the second clip 880 is installed on the first clip 870, the first surface 951 of the protrusions 968 of the first clip 870 contacts the second surface 996 of the first recesses 994 of the second clip 880. The retention features 998 of the recesses 994 contact a top portion 999 of the protrusion 968 near the edges 977. In the installed position, interference or engagement between the retention features 998 and the protrusions 968 restricts or prevents removal of the second clip 880 from the first clip 870 without sufficient external force, thereby retaining the second clip 880 in an installed position.

Referring back to FIGS. 25A-25E, the second clip 880 includes a third portion 1002 and a fourth portion 1004 opposite the third portion 1002. The third and fourth portions 1002, 1004 extend in a second direction generally longitudinally from the body 978 of the second clip 880. Each of the third and fourth portions 1002, 1004 define a second slot or recess 1010. In the configuration shown in the figures, the second recesses 1010 have an elongated semi-circular shape. The second recess 1010 is configured to receive a portion of the cable 810, such as when the second clip 880 is installed on and in contact with the first clip 870. For example, when the second clip 880 is installed on the first clip 870, at least some of the first portion 960 of the cable 810 is received in the second recess 1010 of the third portion 1002 and at least some of the second portion 962 of the cable 810 is received in the second recess 1010 of the fourth portion 1004.

Figure 25A:
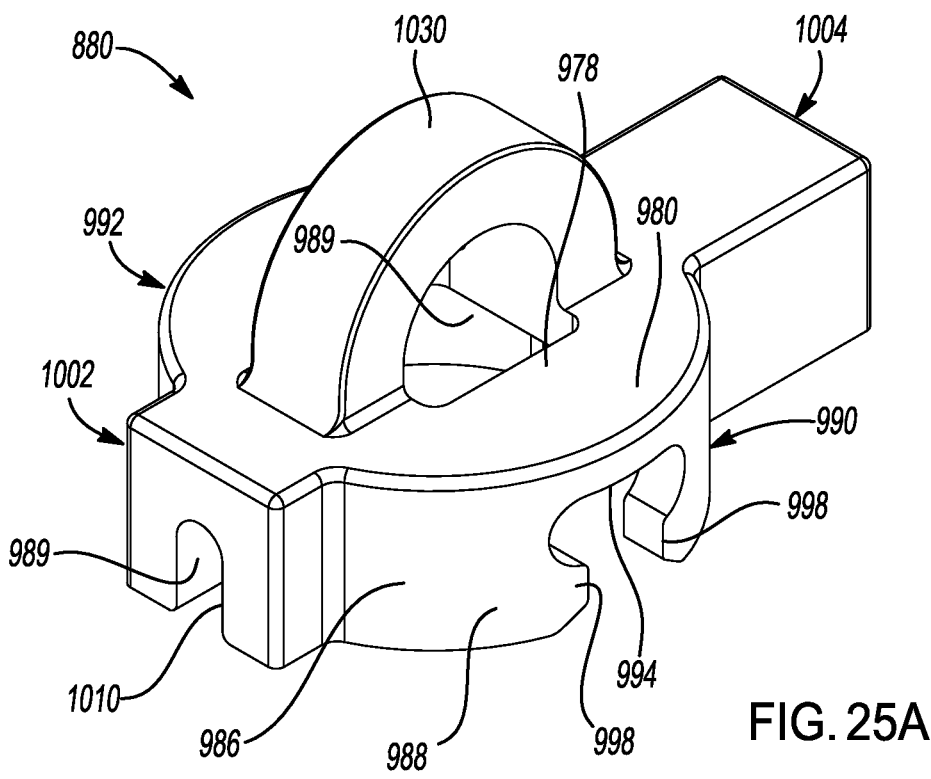
FIG. 25A is a perspective view of the second clip of the cable assembly of FIGS. 23 and 24.
Figure 25B:
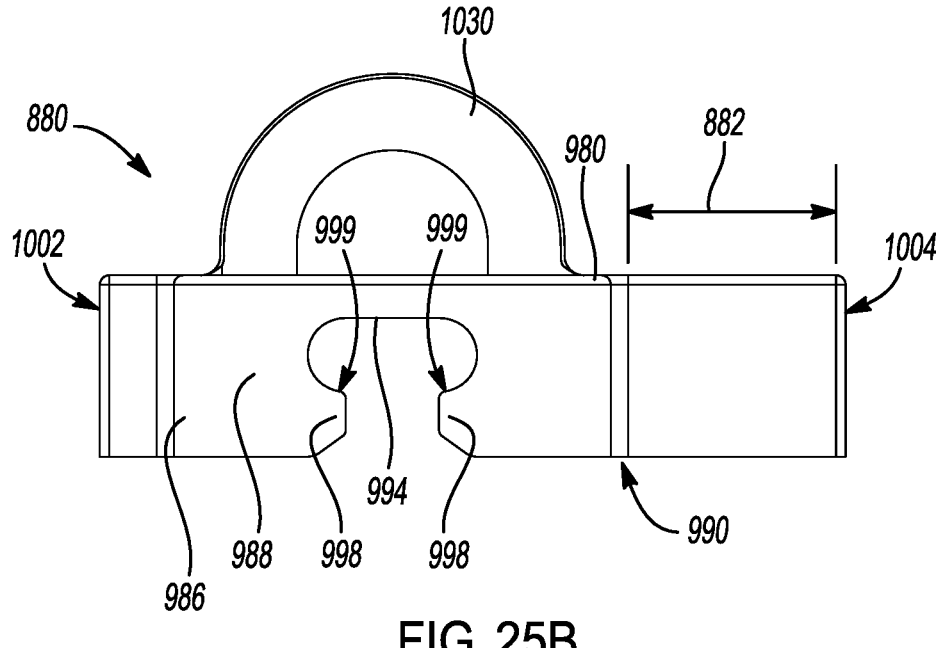
FIG. 25B is a front view of the second clip of FIG. 25A.
Figures 25C, 25D, 25E:
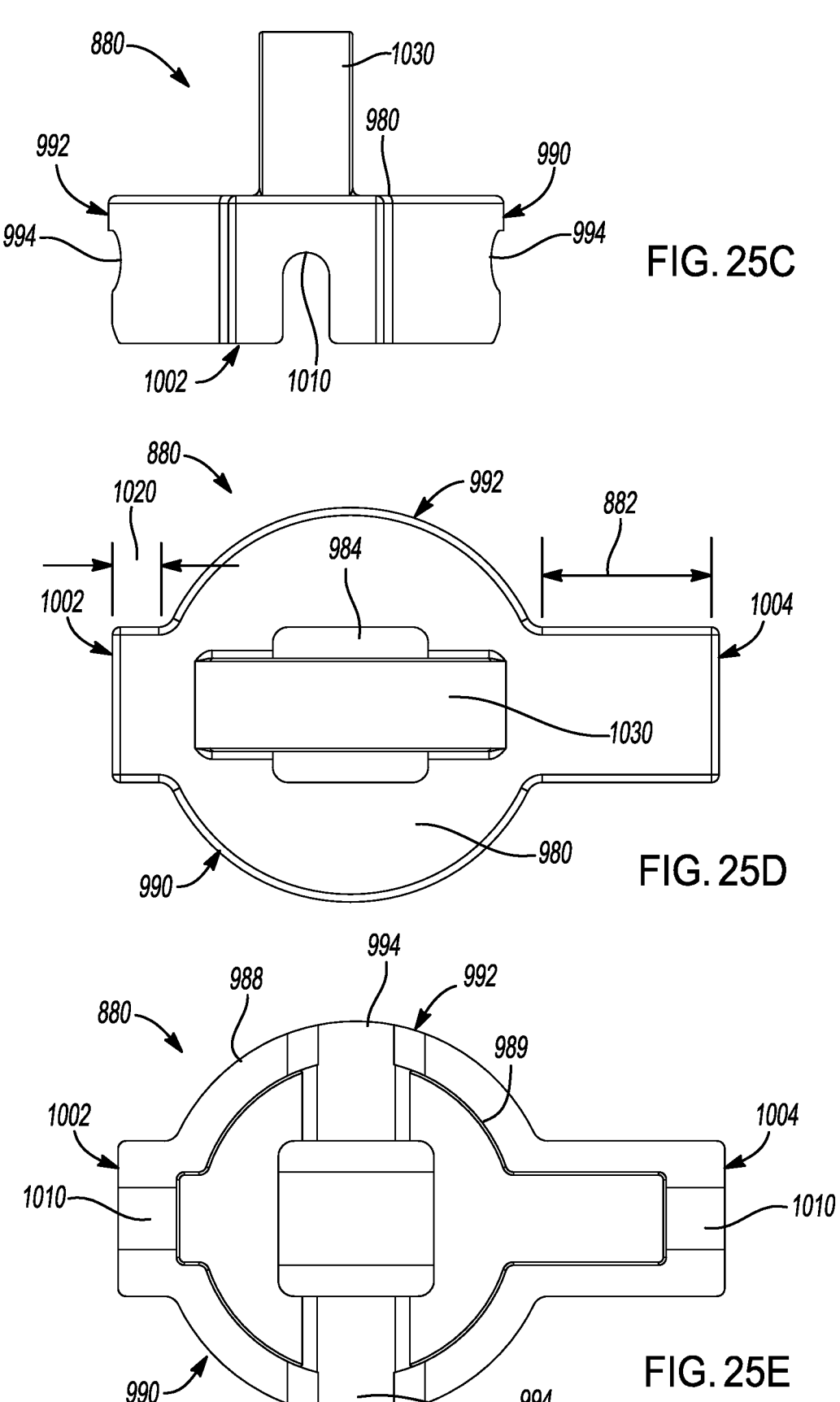
FIG. 25C is a side view of the second clip of FIG. 25A.
FIG. 25D is a top view of the second clip of FIG. 25A.
FIG. 25E is a bottom view of the second clip of FIG. 25A.

The third portion 1002 of the second clip 880 has a second dimension 1020 (FIG. 25D). The fourth portion 1004 of the second clip 880 has the first dimension 882 (19, 24, 25B, and 25D). The first dimension 882 and/or the second dimension 1020 of the second clip 880 may be tailored to meet the desired configuration of the cable assembly 716. For example, the first dimension 882 of the second clip is 880 may be the same as the first dimension 890 of the cable 810.

It can be appreciated that the first dimension 882 of the second clip 880 of FIGS. 23-25 is relatively larger than the first dimension 352 of the second clip 350 of FIGS. 11-13. Likewise, the first dimension 890 of the cable 810 of FIGS. 23-24 is larger than the first dimension 360 of the cable 310 of FIGS. 11-12. Accordingly, the first dimensions 352, 882 of the second clips 350, 880 can be tailored to achieve the desired lengths of the cables 310, 810 between the first clips 340, 870 and the end caps 316, 828 when the cable assemblies 116, 716 are installed in the seat assembly. The first dimensions 352, 882 of the second clips 350, 880 and the respective cable lengths 360, 890 are tailored to meet the desired configuration of the particular seat adjustment assembly.

With renewed reference to FIGS. 23-24, the second clip 880 is configured to be removed from the first clip 870. The second clip 880 includes a tab 1030 disposed on and extending from the first wall 980. The tab 1030 may be integrally formed with the first wall 980. When the tab 1030 is pulled with a sufficient force, the retention features 998 will release or disengage from the protrusions 968. Thus, the second clip 880 may be removed from the first clip 870.

Figure 26:
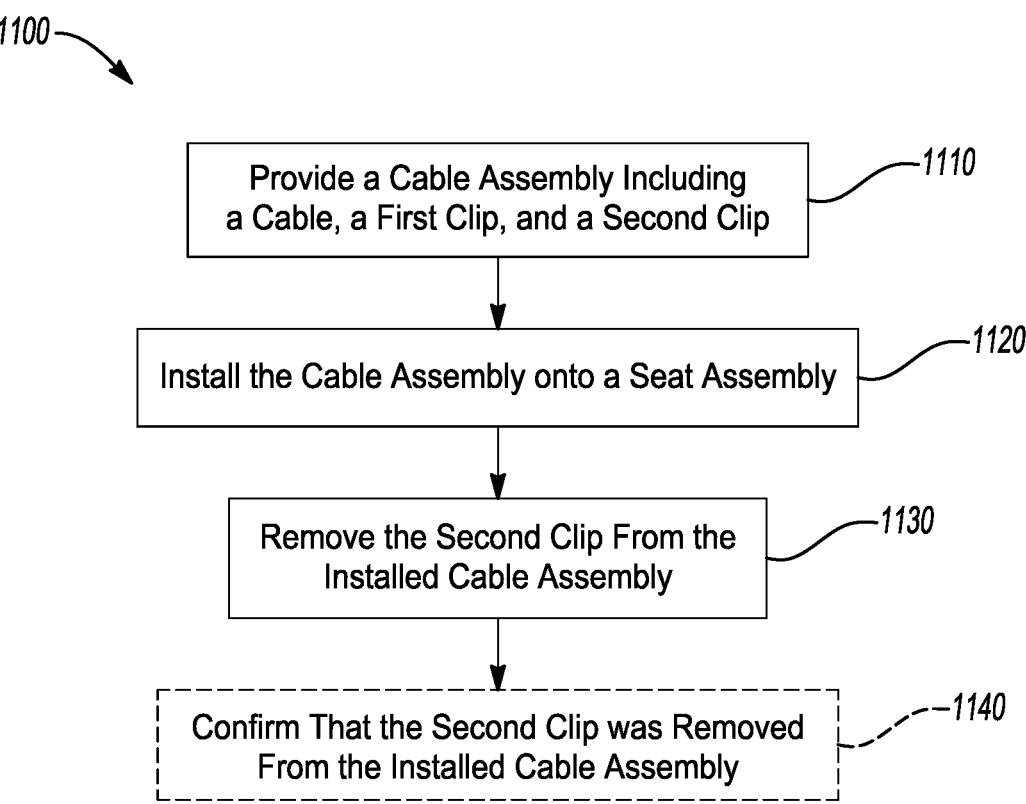
FIG. 26 is a flow chart of a method of installing a cable assembly according to the present disclosure.

FIG. 26 is a flow chart illustrating a method 1100 of installing the cable assembly into a vehicle seat assembly. At step 1110 of the method 1100, a cable assembly including a cable (e.g., a vehicle seat release cable), a first clip, and a second clip is provided. The first clip is slidingly engaged to the cable. The second clip is removably engaged to the first clip.

At step 1120, the cable assembly is installed into the seat assembly. In one configuration, the cable assembly may be installed into the seatback (shown in FIGS. 4-15). In another configuration, the cable assembly may be installed into the seat bottom (shown in FIGS. 16-25). In some configurations, a first cable assembly may be installed into the seatback and a second cable assembly may be installed into the seat bottom. At least one locking mechanism of the seat assembly may be configured to receive and retain at least a portion of the first clip and at least a portion of the cable.

At step 1130, the second clip is removed from the first clip. The second clip may be removed by pulling with sufficient force to release it from the first clip. The second clip may be removed by a human operator or by a machine in the seat assembly process.

At step 1140, the method 1100 optionally includes confirming that the second clip was removed from the first clip. The confirming step may include having an operator check to ensure that the second clip is no longer installed in the seat assembly. Additionally or alternatively, a camera system may detect the presence of any remaining second clip after the cable assembly is installed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cable assembly for a vehicle seat assembly, the cable assembly comprising:

a cable including a first end and an end cap disposed thereon;

a first clip slidingly engaged on the cable, the first clip including a first body, wherein the first body includes a distal portion and an attachment portion, wherein the first body defines an aperture in the attachment portion, and wherein at least a first portion of the cable extends through the aperture; and a second clip configured to be removably engaged to the first clip, wherein the second clip includes a second body, a first wall, and sidewalls extending perpendicularly from the first wall, wherein the first wall cooperates with the sidewalls to define an outer surface and an inner surface, wherein a first portion of the second clip extends longitudinally from the second body, wherein the cable has a first dimension extending between a first side of the first clip and the end cap and the first portion of the second clip has a second dimension that is the same as the first dimension.

2. The cable assembly of claim 1, wherein:

the second clip includes a second portion and a third portion, each of the second portion and the third portion define a first recess, and the first recess includes a pair of retention features.

3. The cable assembly of claim 2, wherein the attachment portion includes a first protrusion and a second protrusion opposite the first protrusion.

4. The cable assembly of claim 3, wherein the retention features are configured to engage a surface of each of the first protrusion and the second protrusion to restrict the removal of the second clip from the first clip in an install position.

5. The cable assembly of claim 4, wherein the attachment portion of the first clip at least partially contacts the inner surface of the second clip.

6. The cable assembly of claim 5, wherein:

the first portion includes a second recess, and a second portion of the cable is at least partially disposed in the second recess.

7. The cable assembly of claim 1, wherein the distal portion defines a groove thereon.

8. The cable assembly of claim 7, wherein the distal portion is configured to be removably engaged with a portion of a locking mechanism of the seat assembly.

9. The cable assembly of claim 1, wherein the end cap is configured to be removably engaged with a portion of the locking mechanism of the seat assembly.

10. The cable assembly of claim 1, wherein the second clip comprises a polymer material.

11. A vehicle seat assembly comprising:

a seat including a seatback and a seat bottom;

at least one seat adjustment assembly configured to move the seatback between a first position and a second position, the seat adjustment assembly including a locking mechanism and a cable assembly;

wherein the cable assembly comprises, a cable including a first end and an end cap disposed thereon;

a first clip slidingly engaged on the cable, the first clip including a first body, wherein the first body includes a distal portion and an attachment portion, wherein the first body defines an aperture in the attachment portion, and wherein at least a first portion of the cable extends through the aperture; and a second clip configured to be removably engaged to the first clip, wherein the second clip includes a second body, a first wall, and sidewalls extending perpendicularly from the first wall, wherein the first wall cooperates with the sidewalls to define an outer surface and an inner surface, wherein a first portion of the second clip extends longitudinally from the second body, and wherein the cable has a first dimension extending between a first side of the first clip and the end cap and the first portion of the second clip has a second dimension that is the same as the first dimension.

12. The seat assembly of claim 11, wherein:

the second clip includes a second portion and a third portion, each of the second portion and the third portion define a first recess, and the first recess includes a pair of retention features.

13. The seat assembly of claim 12, wherein the attachment portion includes a first protrusion and a second protrusion opposite the first protrusion.

14. The seat assembly of claim 13, wherein the retention features are configured to engage a surface of each of the first protrusion and the second protrusion and restrict the removal of the second clip from the first clip in an install position.

15. The seat assembly of claim 14, wherein:

the first portion includes a second recess, and a second portion of the cable is at least partially disposed in the second recess.

16. The seat assembly of claim 11, wherein the cable assembly is mounted to the seatback and the seat adjustment assembly is configured to move the seatback in a first direction relative to the seat bottom.

17. The seat assembly of claim 11, wherein the cable assembly is mounted to the seat bottom and the seat adjustment assembly is configured to move the seat bottom in a first direction relative to a vehicle floor.

18. A method of installing a cable assembly into a seat assembly, the method comprising:

installing a first end of a cable of the cable assembly into a first portion of a locking mechanism, wherein the cable includes an end cap disposed on the first end;

installing a first clip of the cable assembly into a second portion of the locking mechanism, wherein:

the first clip includes a distal portion and an attachment portion, the distal portion is disposed in the second portion of the locking mechanism, a second clip is removably engaged to the attachment portion of the first clip, the second clip includes a body, a first wall, and sidewalls extending perpendicularly from the first wall, the first wall cooperating with the sidewalls to define an outer surface and an inner surface, and a first portion of the second clip extends longitudinally from the body, the cable has a first dimension between a first side of the first clip and the end cap and the first portion of the second clip has a second dimension that is the same as the first dimension; and removing the second clip from the first clip.

19. The method of claim 18, the method further comprising confirming that the second clip was removed from the installed cable assembly.

20. The method of claim 19, wherein the confirming includes detecting whether the second clip is present using a camera detection system.

\* \* \* \* \*